United States Patent
Nabeshima et al.

(10) Patent No.: US 6,567,568 B1
(45) Date of Patent: May 20, 2003

(54) PIXEL INTERPOLATING DEVICE CAPABLE OF PREVENTING NOISE GENERATION

(75) Inventors: Takayuki Nabeshima, Toyokawa (JP); Kenichi Morita, Toyohashi (JP); Junji Nishigaki, Toyokawa (JP); Kazuhiro Ishiguro, Toyokawa (JP); Hideyuki Hashimoto, Toyokawa (JP); Takashi Yamauchi, Toyokawa (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/236,253

(22) Filed: Jan. 25, 1999

(30) Foreign Application Priority Data

Jan. 26, 1998 (JP) .......................... 10-012532
Feb. 12, 1998 (JP) .......................... 10-029691

(51) Int. Cl.[7] .............................. G06K 9/32; H04N 1/46
(52) U.S. Cl. ............................... 382/300; 358/525
(58) Field of Search .............................. 382/298, 254, 382/258, 266, 269, 276, 299, 300, 250; 358/528, 525; 345/132

(56) References Cited

U.S. PATENT DOCUMENTS 5,089,884 A * 2/1992 Suzuki et al. .................. 358/80
5,754,710 A * 5/1998 Sekine et al. ................. 382/300
5,815,605 A * 9/1998 Koike ........................ 382/269
5,889,526 A * 3/1999 Hashimoto ................... 345/430
6,141,452 A * 10/2000 Murao ........................ 382/240

FOREIGN PATENT DOCUMENTS

| JP | 4-181872 | 6/1992 |
|----|----------|--------|
| JP | 6-54172  | 2/1994 |
| JP | 7-99587  | 4/1995 |

OTHER PUBLICATIONS

Eiji Shinbori, "Image Magnification Technique in Digital Image Processing", *Nihon Insatsu Gakkai Shi*, vol. 32, No. 1 (1995), pp. 2–7.

* cited by examiner

Primary Examiner—Bhavesh Mehta
Assistant Examiner—Kanji Patel
(74) Attorney, Agent, or Firm—Sidley Austin Brown & Wood LLP

(57) ABSTRACT

A pixel interpolating device using the IM-GPDCT method and capable of preventing noise generation divides an original image into a plurality of blocks and picks up a block to be processed as a target block. Further, an image peripheral to the target block is extracted as a peripheral image. By using the peripheral image as an extension region, DCT transform is carried out. Thereafter, the peripheral image is magnified, and the IM-GPDCT processing is carried by using the magnified image.

27 Claims, 21 Drawing Sheets

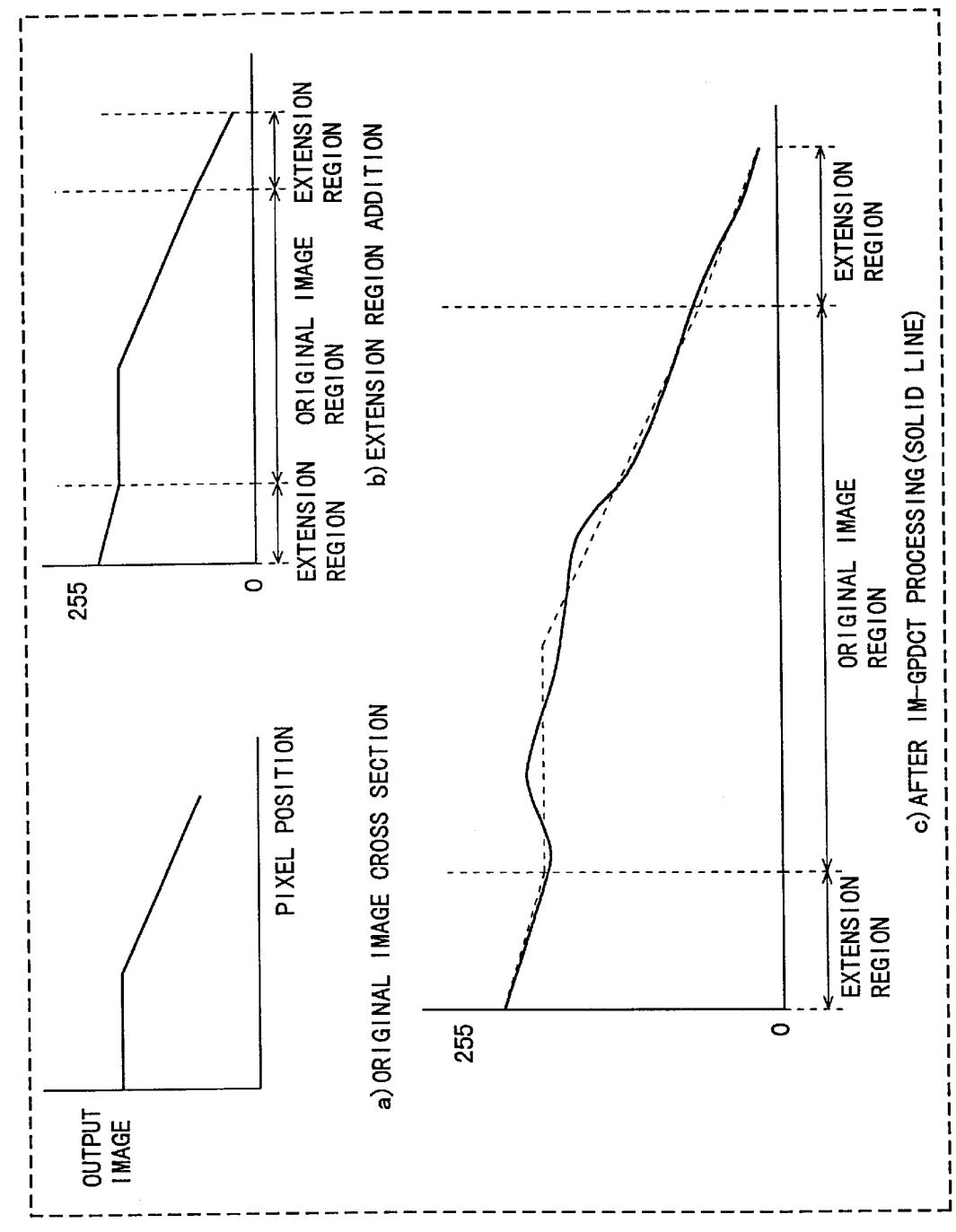
F I G. 7

F I G. 9
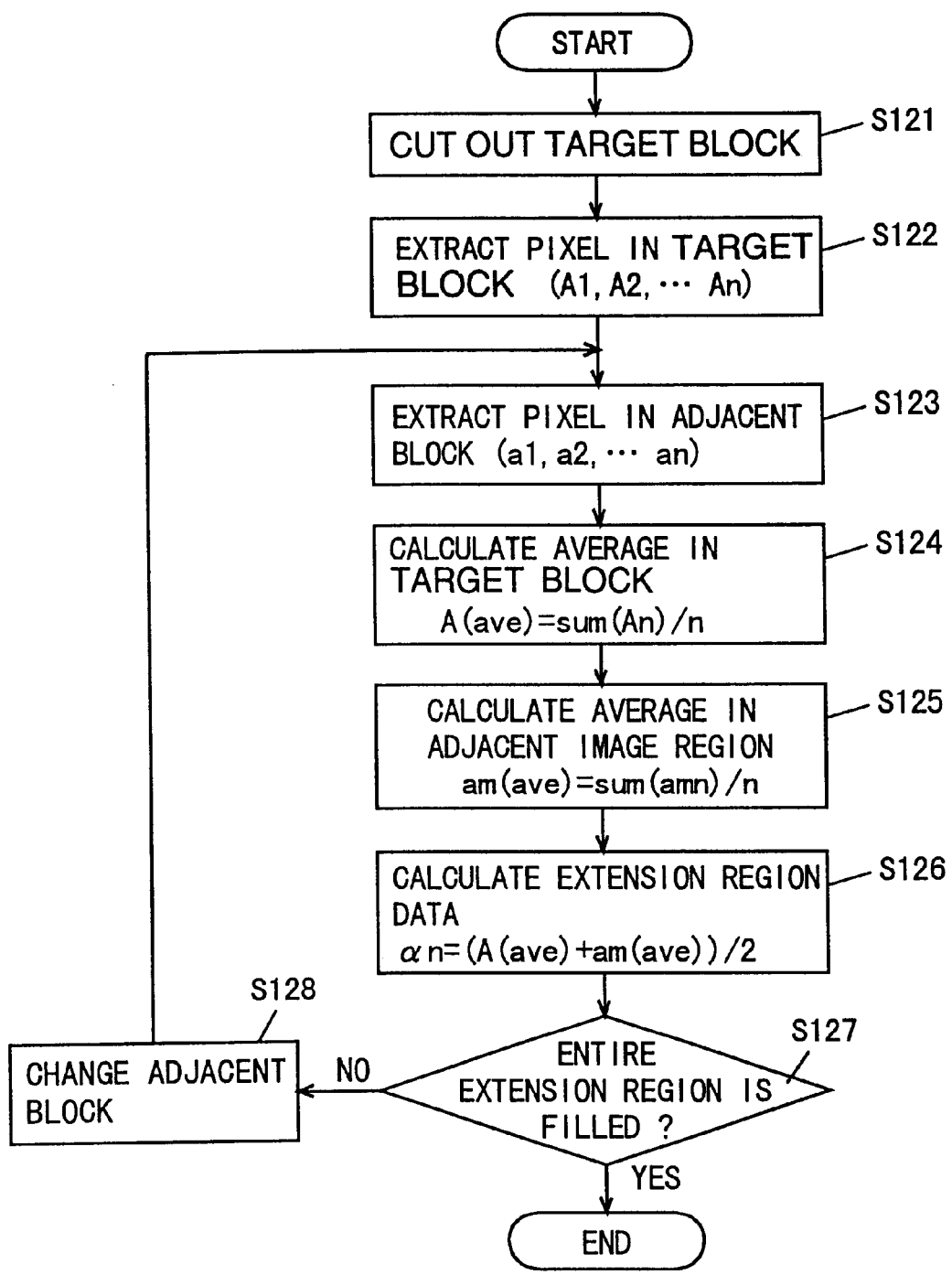

PRIOR ART

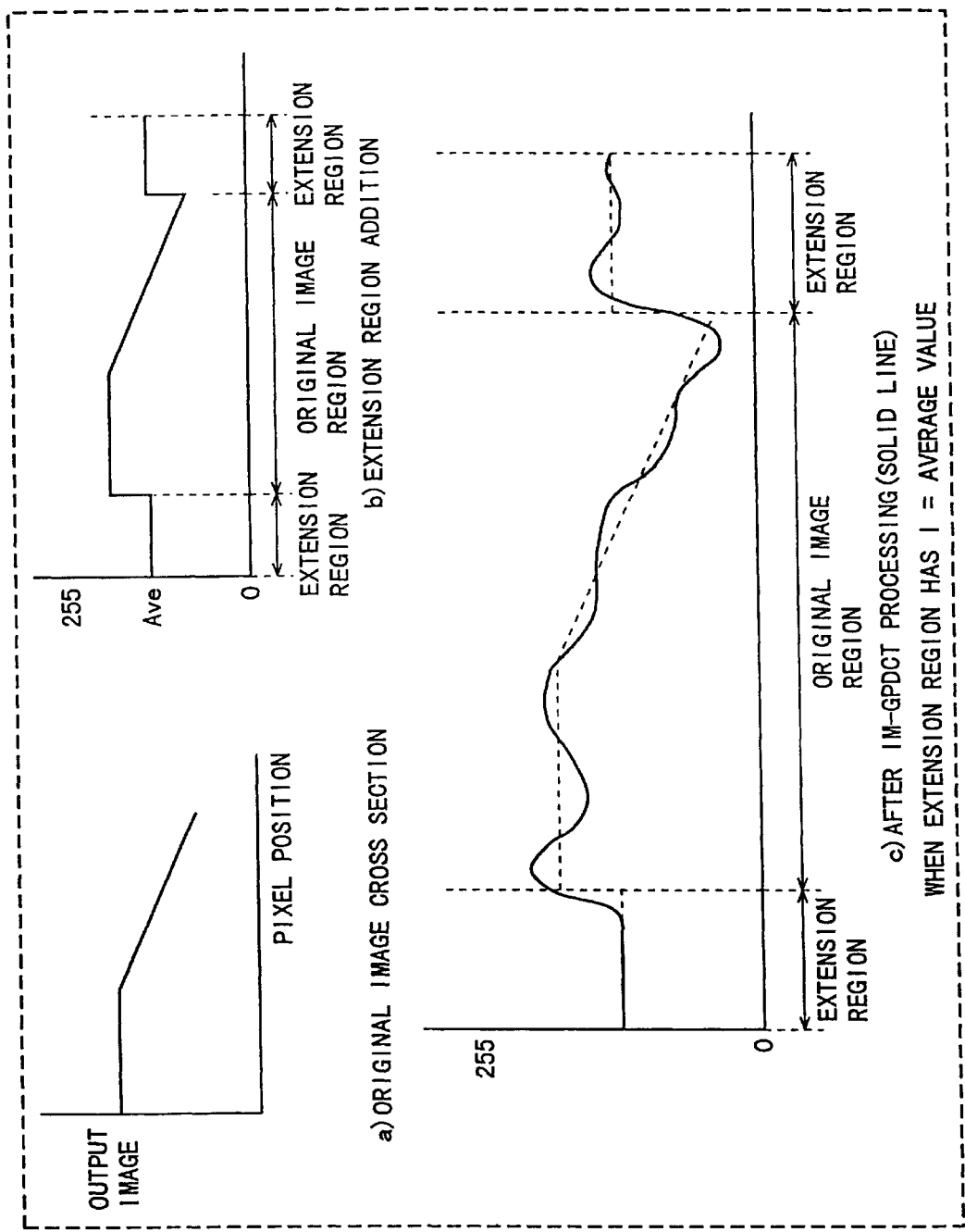
F I G. 2 1   PRIOR ART

PIXEL INTERPOLATING DEVICE CAPABLE OF PREVENTING NOISE GENERATION

This application is based on applications Nos. 10-012532 and 10-029691 filed in Japan, the contents of which is hereby incorporated by reference.

BACKGROUND OF THE INVENTION

1. Field of the Invention

The present invention relates to pixel interpolating devices and more particularly to a pixel interpolating device using the IM-GPDCT method for interpolating a pixel while restoring a high frequency component of an image.

2. Description of the Related Art

In converting a pixel density (interpolating a pixel) of an image based on image information included in a sampled original image, a method ("IM-GPDCT method") is conventionally known which restores a spatial high frequency component, which is lost during a sampling process, under the two restrictive conditions that information on a passing frequency band is correct and an expanse of an image is limited in a process in which normal transformation and inverse transformation of the image are repeated by orthogonal transformation.

The principle of the method will be described in the following. An operation is known which restores an original signal that is lost because a frequency band is limited when an original image is sampled. Such an operation is generally accompanied by the super-resolution problem.

In any observation system that can physically be implemented, a high frequency component of at least a certain frequency cannot be observed.

For example, an image pick-up system has a limited size of an entrance aperture, and the image pick-up system itself functions as a low pass filter (LPF). Thus, a large number of frequency components that can be propagated are lost, and resolution is lowered.

The lost resolution can be obtained only by bandwidth extrapolation (super-resolution problem) in which an original signal prior to passage through the image pick-up system is found from an image signal that can be obtained through the image pick-up system.

The super-resolution problem is mathematically formulated for a function of one variable as described below. When an original signal in a real space region is $f(x)$, a signal that is formed by limiting the frequency component band of original signal $f(x)$ to cut-off frequency $u0$ at most and that actually passes through an image pick-up system is $g(x)$, and the process for carrying out band limitation is expressed as A, the expression (1) below is derived.

$$g(x)=Af(x) \qquad (1)$$

The process A corresponds to actual application of an LPF by passing the original signal through the image pick-up system.

The functions that correspond to Fourier transform of signals $f(x)$ and $g(x)$ above are assumed to be $F(u)$ and $G(u)$, and a window function $W(u)$ in a frequency region is defined by the following expressions (2) and (3).

$$W(u)=1 (|u| \leq u0) \qquad (2)$$

$$W(u)=0 (|u| > u0) \qquad (3)$$

Performance of window function $W(u)$ corresponds to application of an ideal LPF.

Further, the expression (1) above is expressed in a frequency region as the expression (4) below.

$$G(u)=W(u)F(u) \qquad (4)$$

The super-resolution problem is intended to find original signal $f(x)$ from band-limited signal $g(x)$ by the expression (1) in a real space region and to find $F(u)$ from $G(u)$ of the expression (4) in a frequency region.

If original signal $f(x)$ is not limited at all, however, $F(u)$ cannot be found.

Accordingly, the super-resolution problem can be solved by applying a process in which unlimited resolution can be obtained in principle when original signal $f(x)$ is subjected to spatial region limitation so that an object has a limited size, and $f(x)$ only exists in a certain region, a region between $-x0$ and $+x0$, for example, and it does not exist outside the region.

Conventionally, the Gerchberg-Papoulis iteration method (GP iteration method) is used to solve the super-resolution problem.

FIG. 14 illustrates the principle of the GP iteration method. In FIG. 14(A), (C), (E) and (G) correspond to a frequency region while (B), (D), (F) and (H) correspond to a real space region. FIG. 14(B) shows original signal $f(x)$ of which region is limited to a space $|x| \leq x0$. FIG. 14(A) shows Fourier transform $F(u)$ of original signal $f(x)$, and $F(u)$ includes even an unlimitedly high frequency component because the region of original signal $f(x)$ is limited.

FIG. 14(C) indicates that only $G(u)$, which is the part of the space $|u| \leq u0$ of $F(u)$, is observed. In other words, the expression (4) using a window function such as the expressions (2) and (3) above is formed.

Inverse Fourier transform of $G(u)$ is $g(x)$ in FIG. 14(D). Solving the super-resolution problem is to find $F(u)$ or $f(x)$ from $G(u)$ above.

The operation in the GP iteration method will be described in the following. Since the band of $G(u)$ is limited to $|u| \leq u0$, $g(x)$ extends unlimitedly.

Since it is known that the region of original signal $f(x)$ is limited to the interval $|x| \leq x0$, however, the same region limitation is performed even on $g(x)$.

In short, only the part of interval $|x| \leq x0$ in $g(x)$ is extracted to obtain $f1(x)$. When $f1(x)$ is expressed as an expression that uses a window function $w(x)$ expressed by the following expressions (5) and (6), the expression (7) is obtained. This is function $f1(x)$ shown in FIG. 14(F).

$$w(x)=1 (|x| \leq x0) \qquad (5)$$

$$w(x)=0 (|x| > x0) \qquad (6)$$

$$f1(x)=w(x)g(x) \qquad (7)$$

Fourier transform of $f1(x)$ results in $F1(u)$ in FIG. 14(E). Since the region of $f1(x)$ is limited, $F1(u)$ extends unlimitedly. However, a correct value of $G(u)=F(u)$ is already known for space $|u| \leq u0$, and therefore the portion of $|u|=\leq u0$ in $F1(u)$ is substituted by $G(u)$.

The waveform formed in this manner is $G1(u)$ in FIG. 14(G). The relations are expressed by the expressions (8) to (10). Inverse Fourier transform of $G1(u)$ above is $g1(x)$ in FIG. 11(H).

$$G1(u)=G(u)+(1-W(u))F1(u) \qquad (8)$$

$$G1(u)=G(u) (|u| \leq u0) \qquad (9)$$

$$G1(u)=F1(u) (|u| > u0) \qquad (10)$$

The processing from (C), (D) to (G), (H) in FIG. 14 is the first round of the GP iteration method. Then, the operation of extracting only the portion of interval |x|=≦u0 from g1(x) in FIG. 14(H), carrying out Fourier transform on f2(x) (not shown) corresponding to f1(x) in FIG. 14(F), and finding F2(u) (not shown) corresponding to FIG. 14(E) is repeatedly performed. Thus, an original signal can perfectly be restored.

Conventionally, an operation load is reduced by substituting Fourier transform in the GP iteration method by discrete cosine transform (DCT). This is called the "IM-GPDCT" method.

FIG. 15 is a flow chart schematically showing a processing flow carried out in image magnification processing (an example of pixel interpolation processing) using the conventional IM-GPDCT method, and FIG. 16 illustrates the processing of the flow chart in FIG. 15.

It is assumed here that an original image consisting of N×N pixels shown in FIG. 16(A) is magnified m times to produce an image of $(N \times m)^2$ pixels. In FIG. 16, the numbers in parenthesis correspond to the step numbers of the flow chart in FIG. 15.

Referring to FIG. 15, the number of iteration times in the GP iteration method and the value of a magnification rate (resolution conversion rate) are set in step S1. In step S2, an original image to be magnified, shown in FIG. 16(A), is read. In step S3, an image of interest (herein, an image shown in FIG. 16(A)) is extracted.

In step S4, an image extending around the image of interest of N×N pixels (extension region) is found to limit the spatial expanse of the image. Conventionally, the data of an image to be extended is fixed to a particular value, and calculation of extension region data is not carried out. That is, in step S4, predetermined image data "L" is added as an extension region to the original image, and expansion to an image of nN×nN pixels shown in FIG. 16(B) is performed. Here, n is a real number larger than 1, and n is set so that nmN is a power of 2.

In step S5, the image in FIG. 16(B) is transformed to a frequency component a shown in FIG. 16(C) by two-dimensional DCT transform. The frequency component a is known information in the DCT region and corresponds to a spatial low frequency component.

In step S6, the value of a is stored. In step S7, the frequency band of frequency component a is extended to a high frequency band according to a magnification rate, as shown in FIG. 16(D).

At this time, the high frequency band for expansion is set to an initial value 0. The extended frequency region is set to have nmN×nmN pixels.

In step S8, inverse DCT (IDCT) is carried out on the frequency region extended as shown in FIG. 16(D) to be transformed to an image region. At this time, the image region has an image size of nmN×nmN, and a portion a of mN×mN pixels at the center is a magnified image.

In step S9, the number of iteration times is updated. In step S10, the region, indicated by × signs, outside the mN×mN-pixel portion α at the center in FIG. 16(E) is corrected to a not-clear but predetermined value "L" by IDCT. Thus, the state of FIG. 16(F) is attained.

This operation is called spatial region limitation. When DCT is carried out on the image in FIG. 16(F) having the corrected extension region in step S11, the frequency component b shown in FIG. 16(G) can be obtained.

In step S12, a low frequency region of the frequency component b obtained in step S11 is substituted by a known value a to attain the state of FIG. 16(H).

In step S13, IDCT is carried out on the region including frequency components a and b to obtain the image in FIG. 16(I). In step S14, a determination is made as to whether the number of iteration times exceeds a preset value and, when it does not, the processing from step S9 to step S13 is repeatedly performed.

When the number of iteration times exceeds the value in step S14, the magnified image is output in step S15, and all the operation is completed.

In the conventional technique described above, an original image is not divided but it is transformed at a time. When DCT transform is carried out on a large sized image, however, enormous processing time is required, which makes the conventional method non-practical.

Accordingly, the method of once dividing an original image into small sized image blocks and then carrying out resolution conversion processing in each block has been proposed.

FIG. 17 schematically shows how an original image block is cut out and an extension region is set in the conventional IM-GPDCT processing.

Referring to FIG. 17, an original image (#601) is divided into images of predetermined N×N pixels (#602) by block division processing. Here, the cut-out block to be processed is called a target block (#603). The entire original image is processed by causing all blocks to be target blocks. A case where a block near the center of the character 像 in the original image is cut out will be described as an example.

An extension region of nN×nN pixels is added to the target block (#604), and the resolution conversion processing thereafter is carried out (#605).

The extension region data is fixed to a particular value as described above. In the conventional method, "0," "255," or the average value of image data in the target block is generally set as the extension region data.

First Problem

FIG. 18 shows three-dimensional image data in a target block. Here, a reflection factor is adopted as image data, and the target block is formed of eight pixels in both of main and sub scanning directions.

As is apparent from FIG. 18, the reflection factor is higher on the far left side and lower toward the near right side in the image data in the target block.

In the following, problems with the conventional technique will be described based on a case where an image on the cross section (cross section A indicated by the dashed line in the figure) of the fourth pixel in the sub scanning direction of the target block is to be processed.

FIG. 19 shows charts for describing problems with a case where image data (reflection factor) in the extension region is set to 255 and the IM-GPDCT processing is carried out in the conventional technique.

Referring to the figure, a) shows relations between a pixel position and its image data on cross section A of the target block in FIG. 18, and b) shows a state where image data L=255 is added to the extension region of the original image. In this case, the extension region data has an unnaturally large value as compared with the original image data, and a large edge is created at a boundary between the original image region and the extension region.

When resolution conversion is performed on the image consisting of the target block and the extension region by the IM-GPDCT method, large winding is created near the edge as shown in c). In other words, the IM-GPDCT method is intended to restore a high frequency component that is lost during a sampling operation, and therefore a high frequency component particularly exists at the edge portion and winding is created because of an attempt to restore the high frequency component.

Especially when blocks are cut out and then combined together after resolution conversion in order to make the processing faster, ringing is caused in each block. Therefore, a block noise is caused in a conspicuous manner in the conventional technique.

FIG. 20 shows charts for describing problems with a case where image data L of the extension region is set to 0 in the conventional technique.

In this case as well, the image data of L=0 is added as the extension region as shown in b), and therefore an excessive edge is created at a boundary between the extension region and the original image region and unnatural winding is found when the IM-GPDCT method is adopted.

FIG. 21 shows charts for describing problems with a case where the image data of the extension region is set to the average value of image data included in the target block in the conventional technique.

As shown in b), an edge portion is created between the extension region and the original image region even when the average value of image data in the original image region of the target block is used for the extension region. Further, the IM-GPDCT processing causes unnatural winding and an image noise as shown in c).

Second Problem

The IM-GPDCT method also has relatively long processing time. When the Bilinear method, for example, which has relatively short processing time, is used, however, the high frequency component of an image cannot be restored.

SUMMARY OF THE INVENTION

The present invention was made to solve the problems above and its first object is to prevent noise generation in a pixel interpolating device.

A second object of the present invention is to improve processing speed in a pixel interpolating device capable of restoring a high frequency component.

In order to achieve the objects above, according to one aspect of the present invention, a pixel interpolating device for interpolating a pixel by restoring a lost high frequency component under the two restrictive conditions that information on a passing frequency band is correct and an expanse of an image is limited in a process in which normal transformation and inverse transformation of an image are repeated by orthogonal transformation includes a cutting-out unit for cutting out a target block from an original image, and a setting unit for setting the data of an extension region of the target block, which is required for pixel interpolation, based on image data peripheral to the target block of the original image.

According to the present invention, noise generation can be prevented in the pixel interpolating device.

According to another aspect of the present invention, a pixel interpolating device for interpolating a pixel in an input image includes a determining unit for determining whether an edge portion exists in the input image, and a switching unit for switching a pixel interpolation method for the input image based on the determination result of the determining unit.

According to the present invention, the pixel interpolation method is switched based on the determination result as to whether an edge portion exists, and therefore the processing speed of the device can be improved.

According to still another aspect of the present invention, a pixel interpolation method includes the steps of a) cutting out a target block from original image data, b) adding an extension region around the target block to obtain an extension block, the data of the extension region being set based on image data peripheral to the target block of the original image, c) carrying out DCT transform on the image data of the extension region to obtain a frequency component, d) extending the obtained frequency component to a high frequency region and setting the initial value of the frequency component of the high frequency region to 0, e) carrying out inverse DCT transform on the frequency component obtained by extending the frequency component in d) to obtain the image data of a magnified extension block, the magnified extension block including a magnified target block at the center of the magnified extension block, f) setting data based on the image data peripheral to the target block of the original image for a peripheral region of the magnified target block in the magnified extension block, g) carrying out DCT transform on the image data of the extension block obtained in f) to obtain a frequency component, h) substituting a low frequency region of the frequency component obtained in g) by the frequency component obtained in c), and i) carrying out inverse DCT transform on the frequency component obtained in h) to obtain image data, magnified image data being obtained by repeating the steps from f) to i) a prescribed number of times.

According to still another aspect of the present invention, a pixel interpolating method includes the steps of determining whether an edge portion exists in an input image, selecting one of the first and second pixel interpolation methods based on the determination result, and carrying out pixel interpolation of the input image by the selected pixel interpolation method.

According to still another aspect of the present invention, an image processing apparatus for interpolating a pixel by restoring a high frequency component by repeating normal transformation and inverse transformation of an image through orthogonal transformation includes a cutting-out unit for cutting out a target block from original image data, a setting unit for setting an extension block by adding an extension region around the target block, the data of the extension region being determined based on image data peripheral to the target block of the original image, a transforming unit for carrying out DCT transform on the image data of the extension block to obtain a frequency component, a frequency extending unit for extending the obtained frequency component to a high frequency region and setting a prescribed value as the initial value of the frequency component of the high frequency region, and an inverse transforming unit for carrying out inverse DCT on the frequency component obtained by extending the frequency region to obtain magnified image data.

According to still another aspect of the present invention, a pixel interpolating device includes a first pixel interpolating unit for interpolating a pixel by restoring a high frequency component of an image, which is lost during sampling, a second pixel interpolating unit different from the first pixel interpolating unit, a determining unit for determining whether an edge portion exists in an input image, and a selecting unit for selecting one of the first and second pixel interpolating units based on the determination result.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7 illustrates effects in the second embodiment.

FIG. 9 is a flow chart showing the processing of setting an extension region in the third embodiment.

FIG. 21 illustrates problems when data I of an extension region is the average value of pixel data included in a target block.

DESCRIPTION OF THE PREFERRED EMBODIMENTS

First Embodiment

Figure 1:
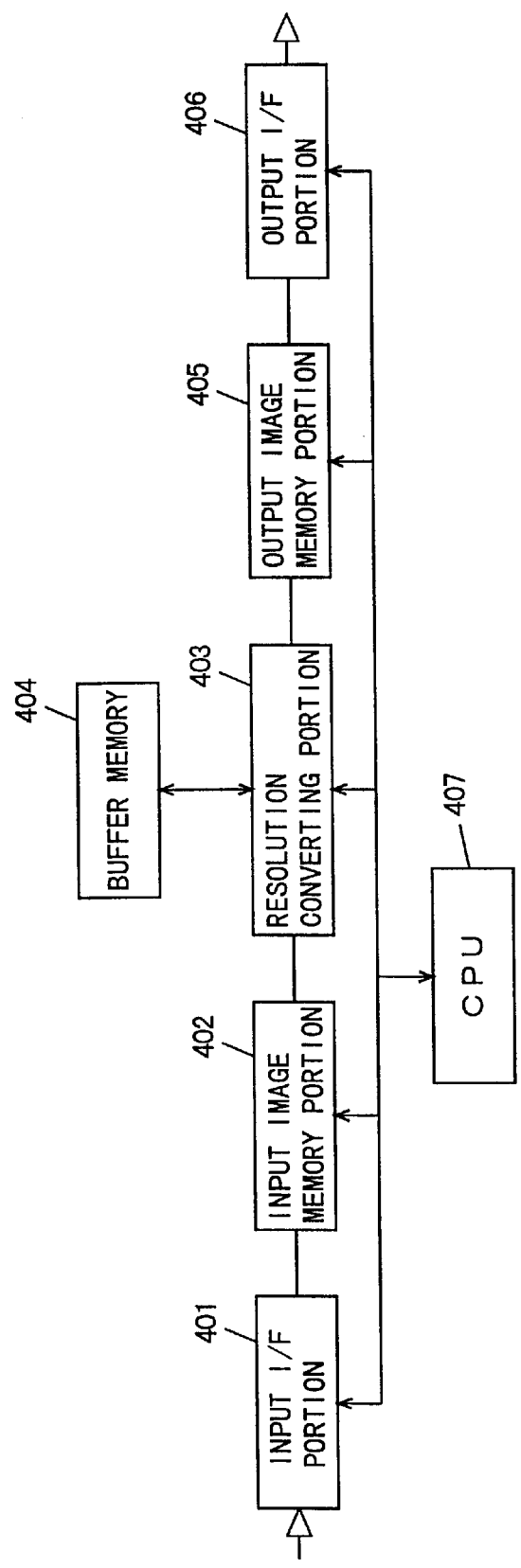
FIG. 1 is a block diagram of a pixel interpolating device in a first embodiment of the present invention.

FIG. 1 is a block diagram of an image processing apparatus in a first embodiment of the present invention. The image processing apparatus carries out magnification of an image by interpolating pixels.

Referring to the figure, the image processing apparatus includes an input interface portion 401 for receiving image data to be processed, an input image memory portion 402 for storing the input image data once, a resolution converting portion 403 for converting resolution, a buffer memory 404, an output image memory portion 405 for storing an output image once, an output interface portion 406 for outputting image data, and a CPU 407 for controlling the entire image processing apparatus.

Image data that is input from an external unit through input interface portion 401 is once stored in input image memory portion 402. The stored image data is read as necessary according to the process, and processed in resolution converting portion 403. Since the image is buffered during the converting processing at this time, buffer memory 404 stores part of the image data. After all the processing is completed, the image that has gone through prescribed resolution conversion is stored in output image memory portion 405 and output through output interface portion 406 to a processing portion, such as a printing device, at a subsequent stage.

Figure 2:
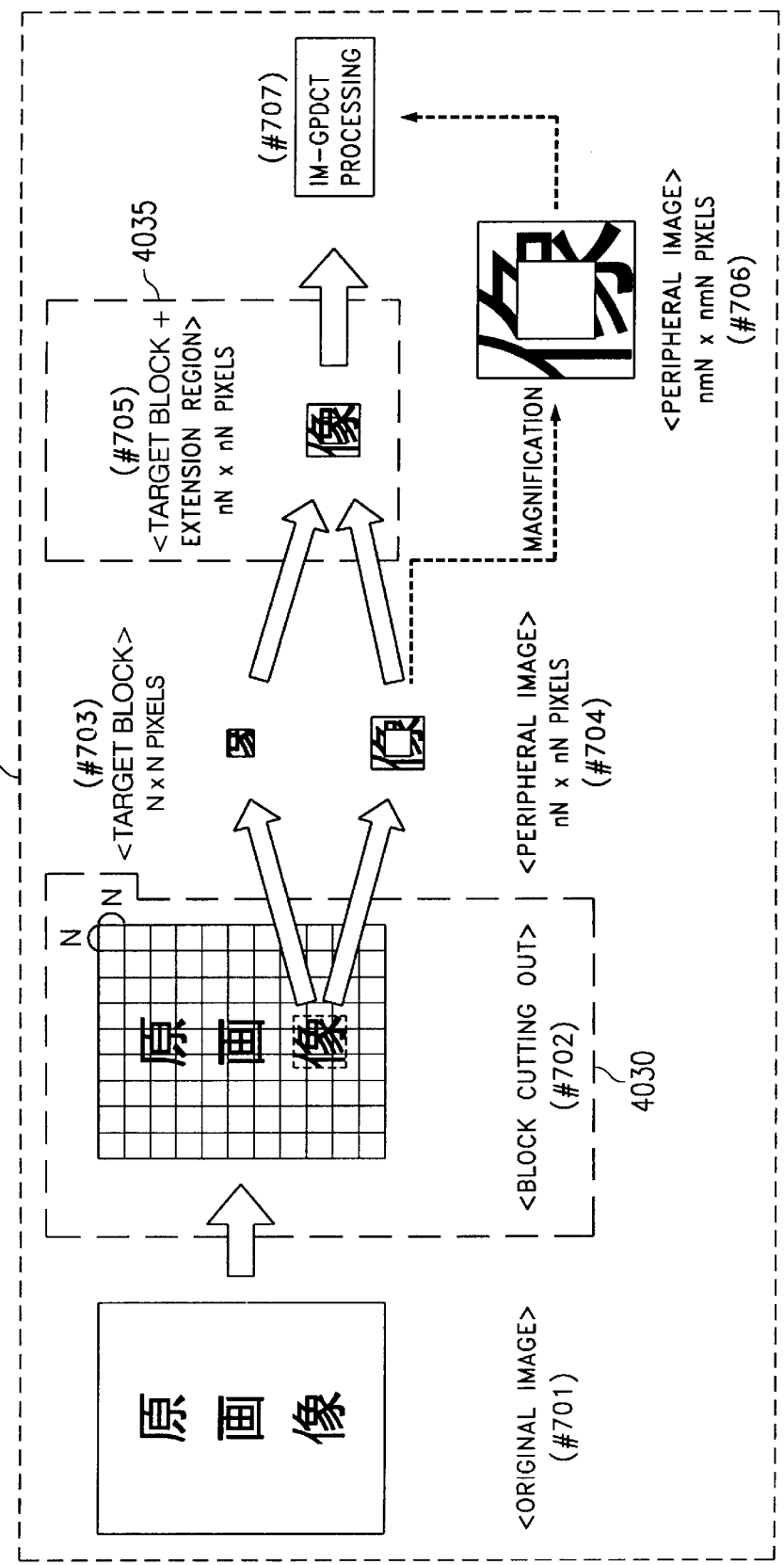
FIG. 2 illustrates processing in the first embodiment.

FIG. 2 illustrates how an original image block is cut out and an extension region is set in the resolution converting portion 403 of the image processing apparatus in this embodiment.

Original image data (#701) input through input interface portion 401 is divided into blocks consisting of predetermined N×N pixels in resolution converting portion 403 (#702). The blocks are successively cut out in the block cutting-out portion 4030 and made an object of image processing. A block that is an object of image processing is called a target block (#703). It is assumed in FIG. 2 that the original image, (#701) is a character image and a block near the center of the 像 character it is cut out as a target block.

In this embodiment, an image of nN×nN pixels (peripheral image) peripheral to the target block of the original image is separately cut out differently from conventional examples, and the image is made the data of an extension region (#704) in the setting unit 4035. The image data of the target block and the image data of the extension region constitute an image of nN×nN pixels (#705), and resolution conversion processing by IM-GPDCT is carried out (#707).

Figure 15:
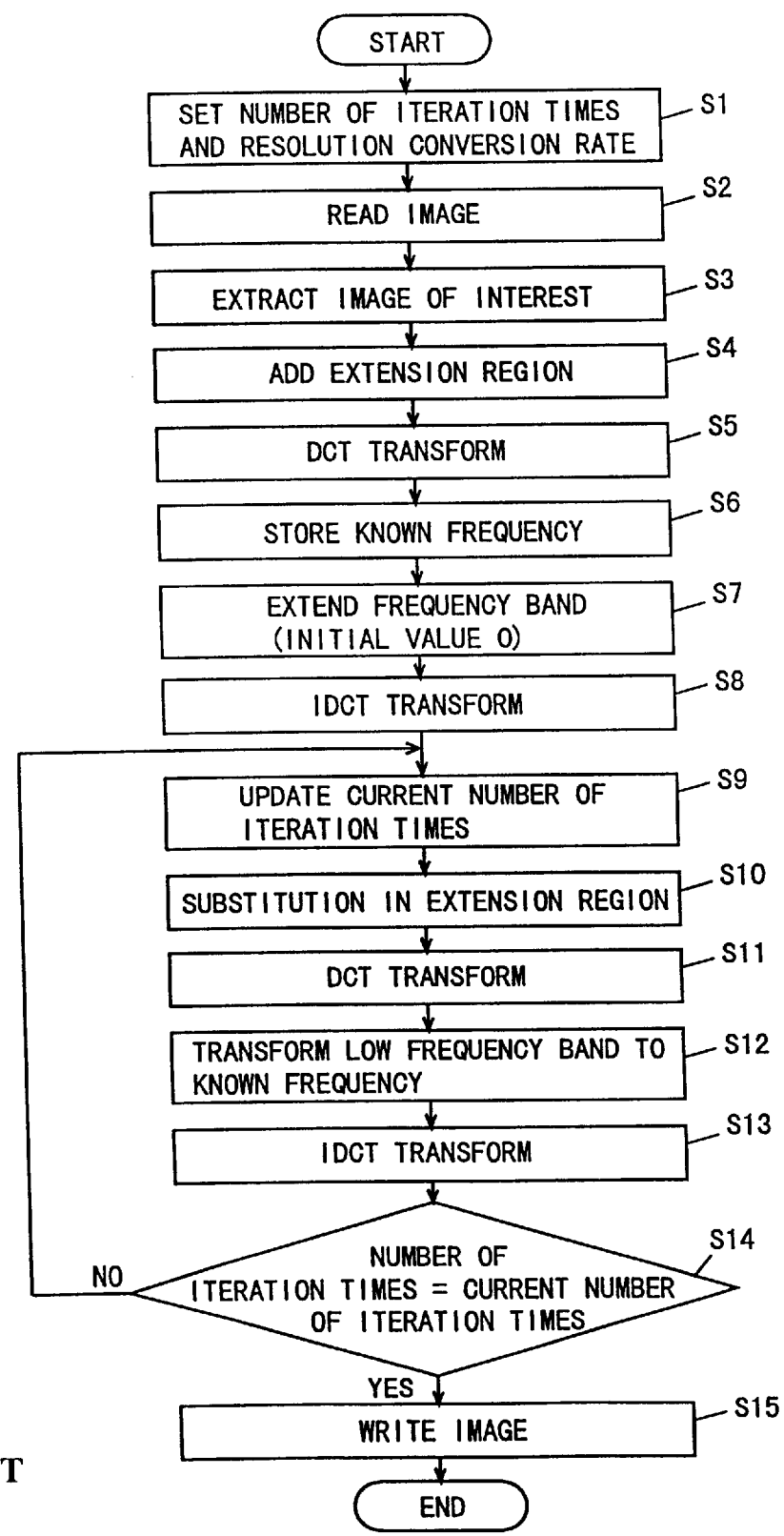
FIG. 15 is a flow chart showing conventional resolution conversion processing.

After DCT transform and IDCT transform, substitution of the extension region is carried out (S10 in FIG. 15). At this time, the data of magnified peripheral image (#704) is used as the extension region data (#706). Magnification processing at this time may be carried out by a typical known magnification technique such as the Nearest Neighbor method and the Bilinear method. These methods are simple pixel interpolation methods that do not reproduce a high frequency component of an image in magnification processing.

Figure 3:
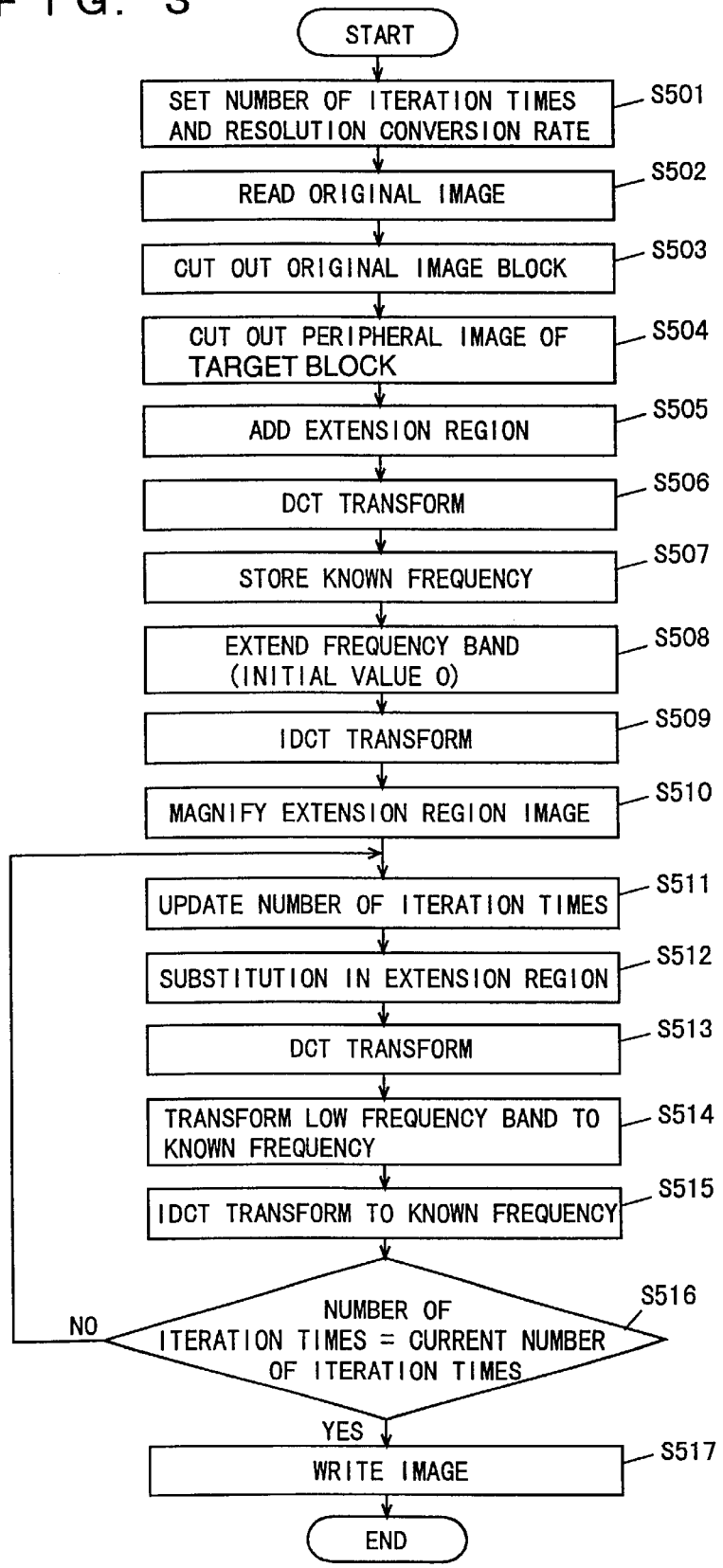
FIG. 3 is a flow chart of resolution conversion processing in the first embodiment.

FIG. 3 is a flow chart of resolution conversion processing performed by the image processing apparatus in this embodiment.

Referring to the figure, the number of iteration times in the IM-GPDCT method and the resolution conversion rate (magnification rate) are set in step S501. In step S502, an original image is then read from input image memory portion 402. In step S503, the process of cutting out a block, for dividing the original image into pieces of a prescribed size, is carried out.

In step S504, a peripheral image (#704 in FIG. 2) of the target block, which has been cut out, is cut out to a prescribed size to be used as an extension region. In step S505, the cut-out peripheral image is added as the extension region of the target block and, in step S506, DCT transform is carried out on the target block and the image data of the extension region.

Although the target block and its peripheral image are separately cut out in this embodiment, an image of a prescribed size including the target block and its peripheral image may be cut out in advance from an original image and DCT transform may be carried out thereafter.

After DCT transform processing, a known frequency component is once stored in buffer memory 404 in step S507. Further, the known frequency component is further extended to a high frequency component in step S508, and "0" is substituted in the high frequency region.

In step S509, inverse DCT transform (IDCT) of data having the extended high frequency region is carried out. Thus, an image formed by converting the resolution of the original image can be obtained. In other words, since the number of image data (number of pixels) are increased by resolution conversion, the image size can be made larger when the image is output at the same output resolution, and magnification processing is made possible. When the size of the output image is made the same as that of the original image, the number of image data is increased. Thus, resolution can be improved.

Since the extension region peripheral to the IDCT-transformed image has a known value, substitution is carried out. Although the image data in the extension region has only a prescribed value in the conventional technique, an image peripheral to the target block is used for substitution in this embodiment. Since the image peripheral to the target block and the resolution-converted image have different sizes, they cannot be substituted as they are. Accordingly, the image peripheral to the target block is magnified in advance in step S510. For magnification, an interpolation method that does not reproduce a high frequency component as described above is used.

In step S511, the number of iteration times is incremented by 1. In step S512, the image magnified in step S510 is written to the extension region. In step S513, DCT transform is carried out.

Since a low frequency region of the data transformed to a frequency component is the known data stored in buffer memory 404 in step S507, substitution of data in a low frequency band is carried out in step S514, and inverse DCT transform is carried out again in step S515.

In step S516, a determination is made as to whether the current number of iteration times is the number of iteration times that is set in step S501, and the processing from step S511 is repeated till the iteration time number attains the set number. When the iteration time number attains the set number, the image of the transformed target block is written to output image memory portion 405, and processing of the next target block is started.

When processing of all the blocks is completed, conversion processing ends.

Figure 4:
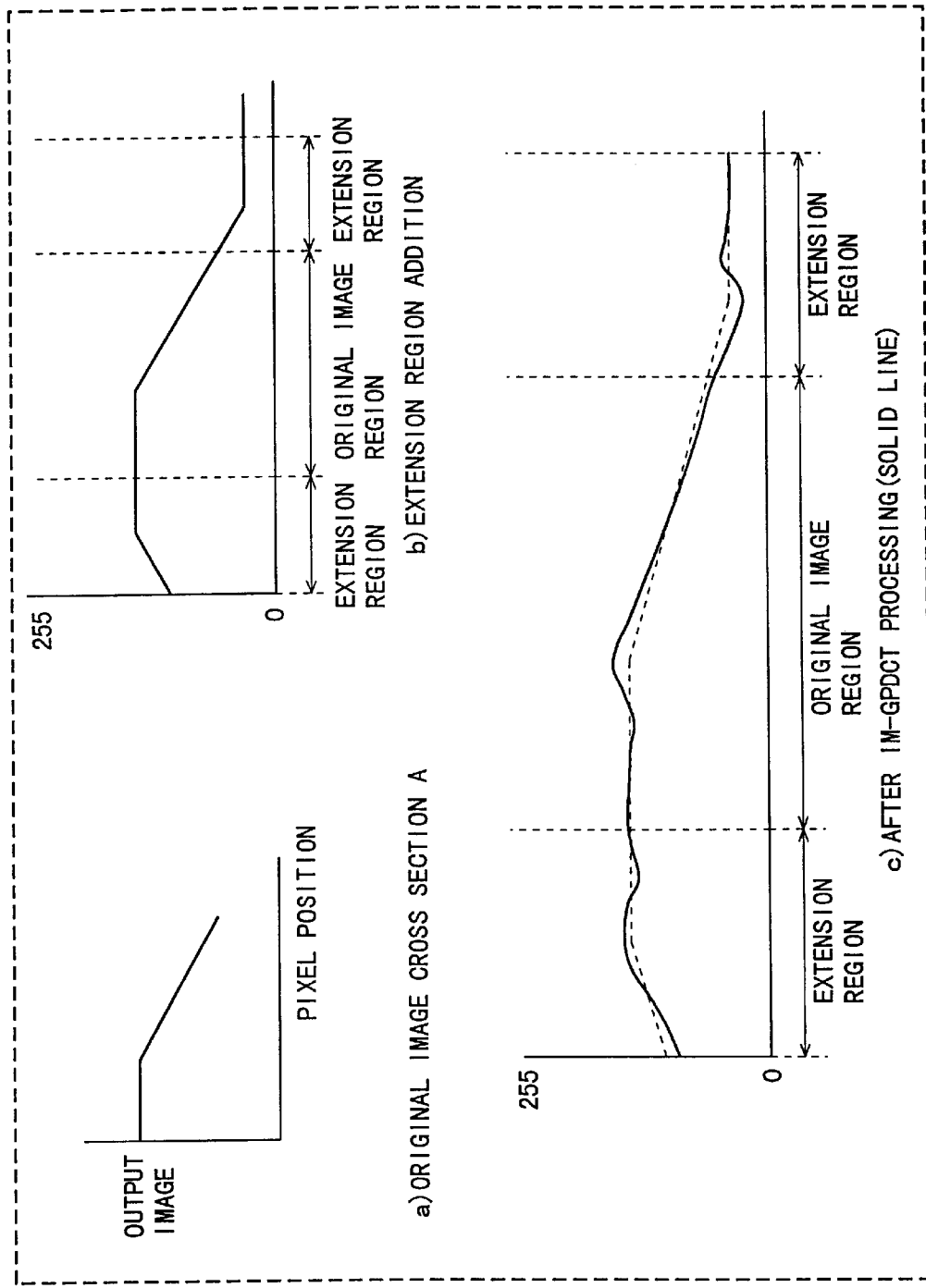
FIG. 4 illustrates effects in the first embodiment.
Figure 16:
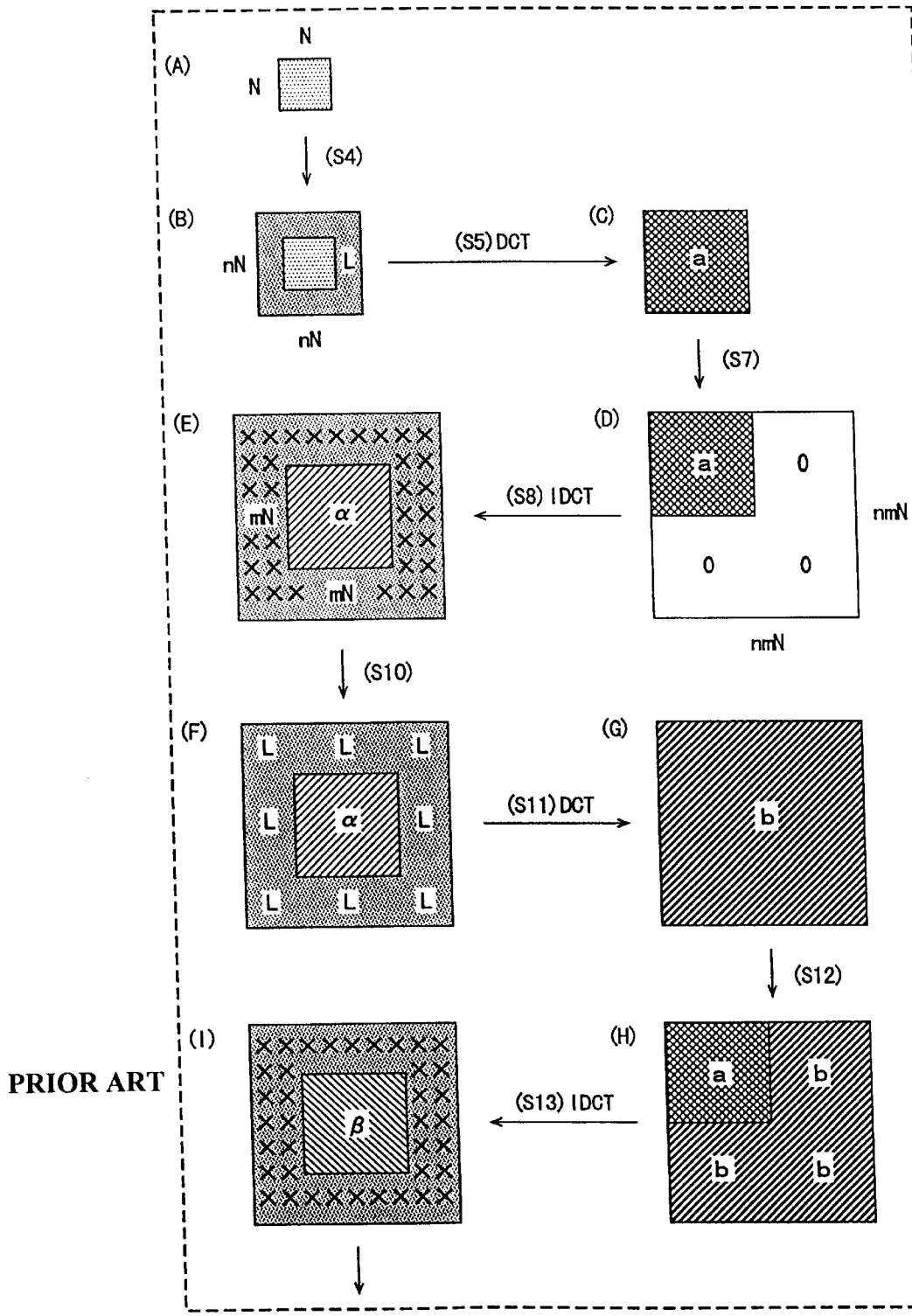
FIG. 16 schematically shows the IM-GPDCT method.
Figure 17:
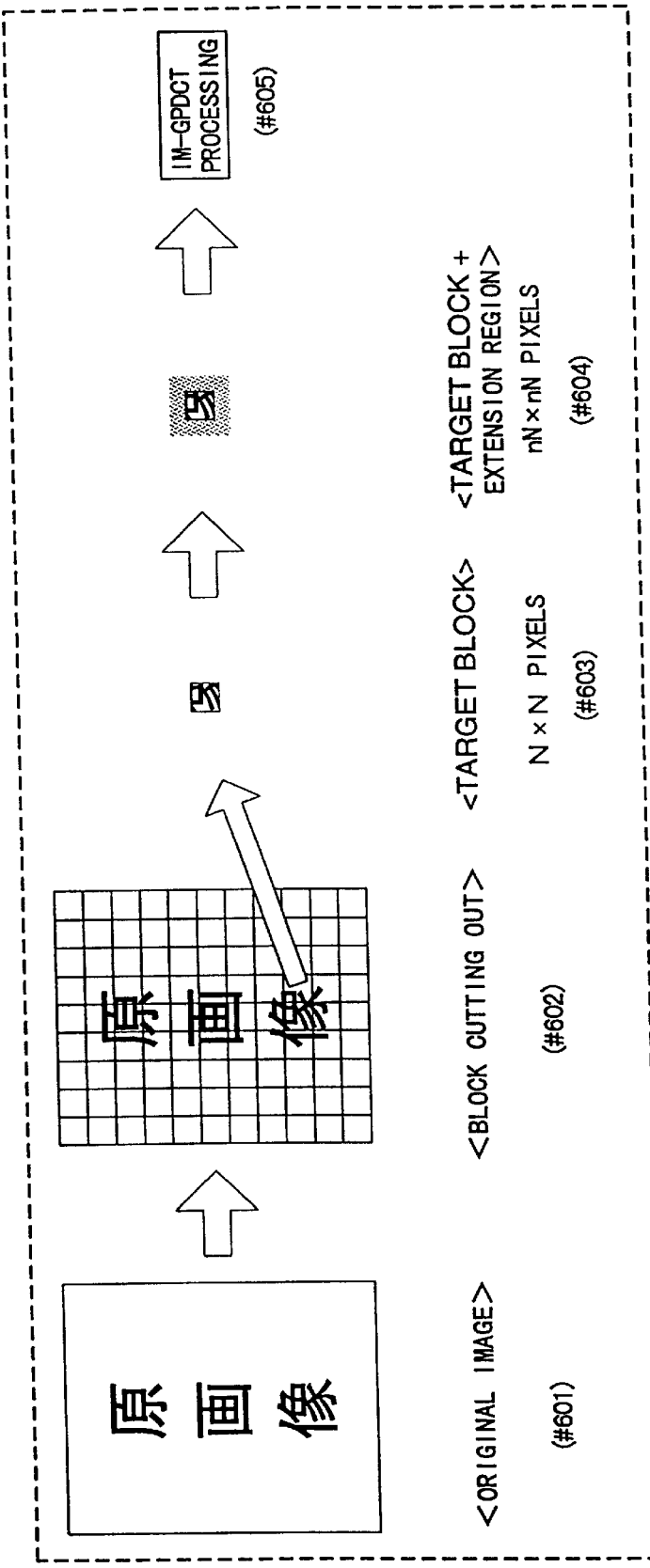
FIG. 17 illustrates the conventional processing of the IM-GPDCT method.
Figure 18:
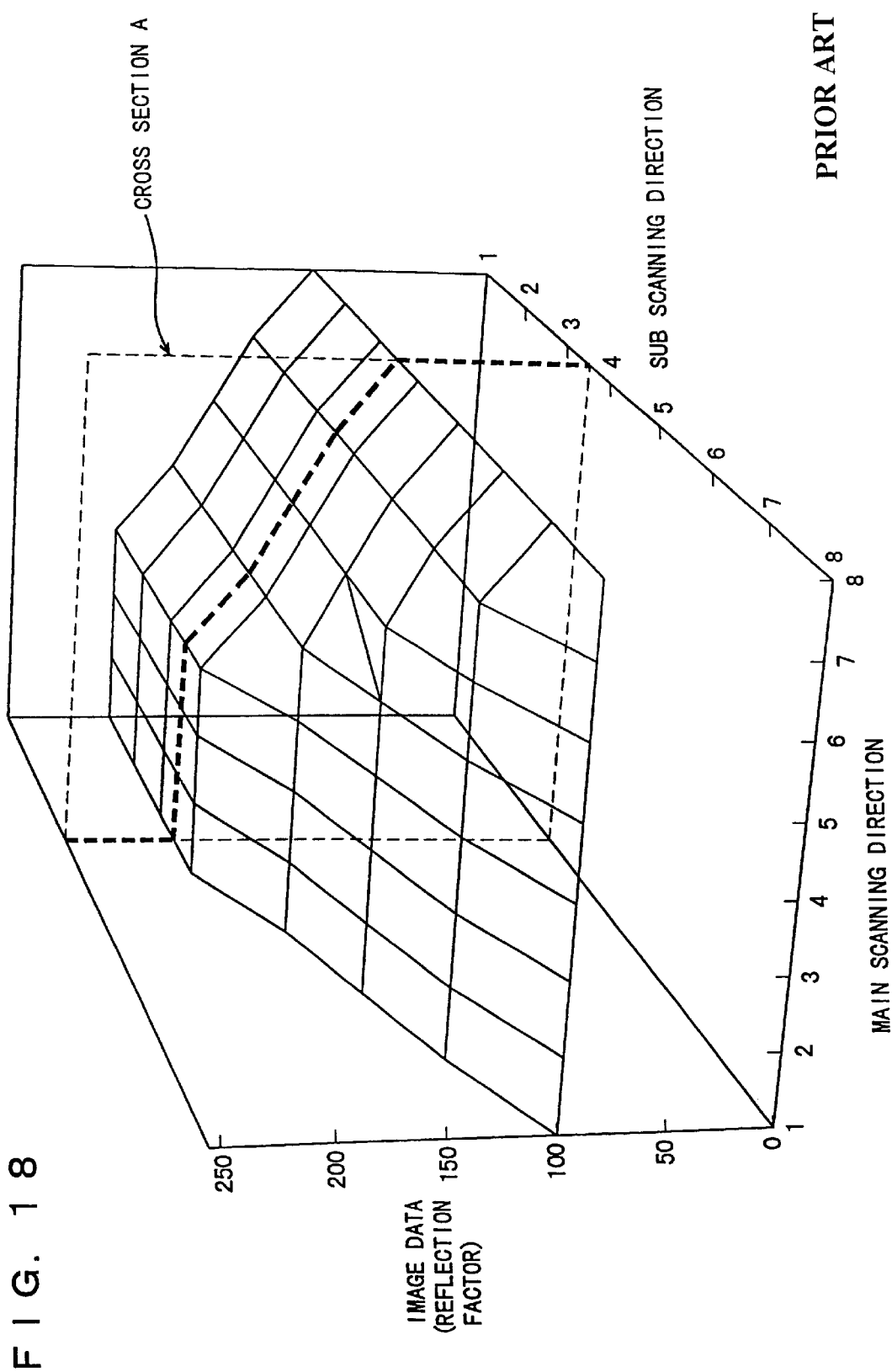
FIG. 18 shows a specific example of image data of a target block, which is an object for image processing.
Figure 19:
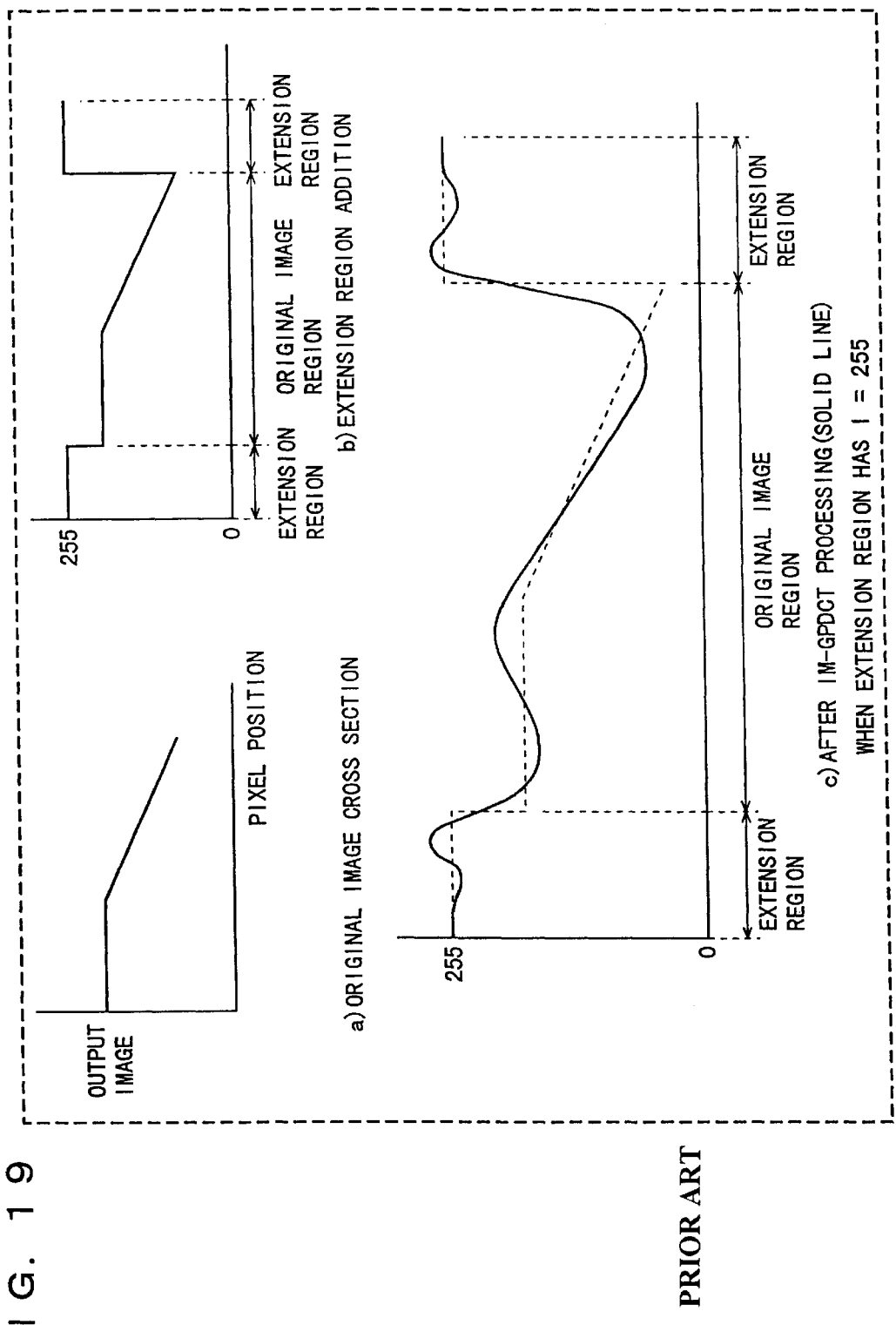
FIG. 19 illustrates problems when data I of an extension region is 255.
Figure 20:
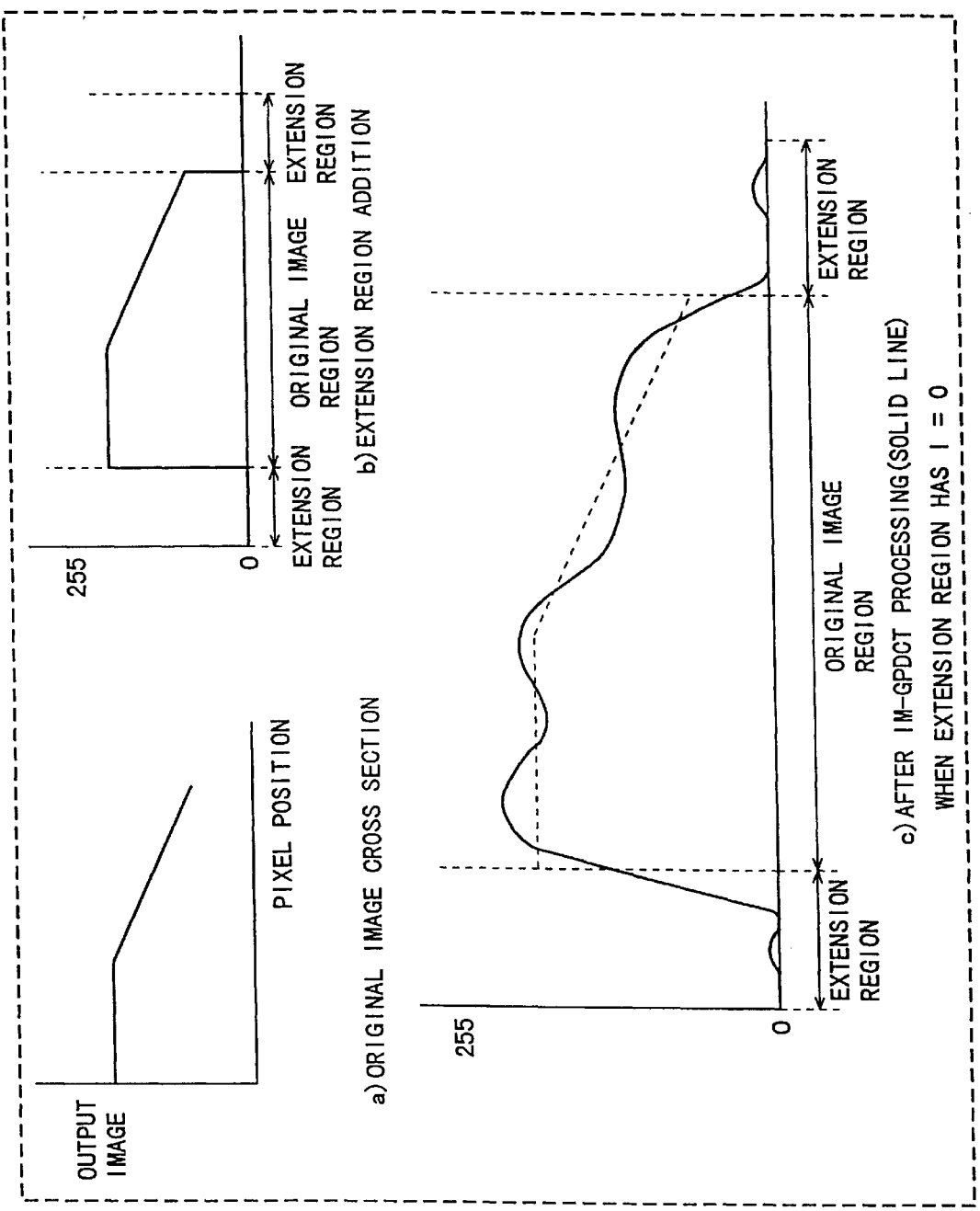
FIG. 20 illustrates problems when data I of an extension region is 0.

FIG. 4 illustrates the effects of the image processing apparatus in this embodiment, and corresponds to FIGS. 16 to 18.

In FIG. 4, a) shows a state where the image data of a target block is of cross section A. In this embodiment, an image peripheral to the target block is added as an extension region to the region of an original image shown in a), as shown in b). Accordingly, an unnatural edge is not created between the extension region and the original image region. That is, the image has natural continuity even after the extension region is added.

As shown in c), an image having the image peripheral to the original image as the extension region does not have image winding, caused by an edge, at a boundary between the extension region and the original image region differently from the conventional technique, even when a high frequency component is restored. Accordingly, an edge noise for each block image is not caused even after combination of blocks, and therefore a block noise that may occur in the entire image can be prevented.

When an original image actually includes a high frequency component, the high frequency component is restored by the IM-GPDCT method. Accordingly, a blurred image can be prevented even when the image is magnified or resolution is converted.

Since image processing is performed after blocks are cut out from an original image in this embodiment, it is not necessary to carry out DCT transform on a large sized original image at a time. Thus, time necessary for image processing can be shortened.

Second Embodiment

The block diagram of an image processing apparatus in a second embodiment of the present invention is similar to that of the first embodiment shown in FIG. 1.

Figure 5:
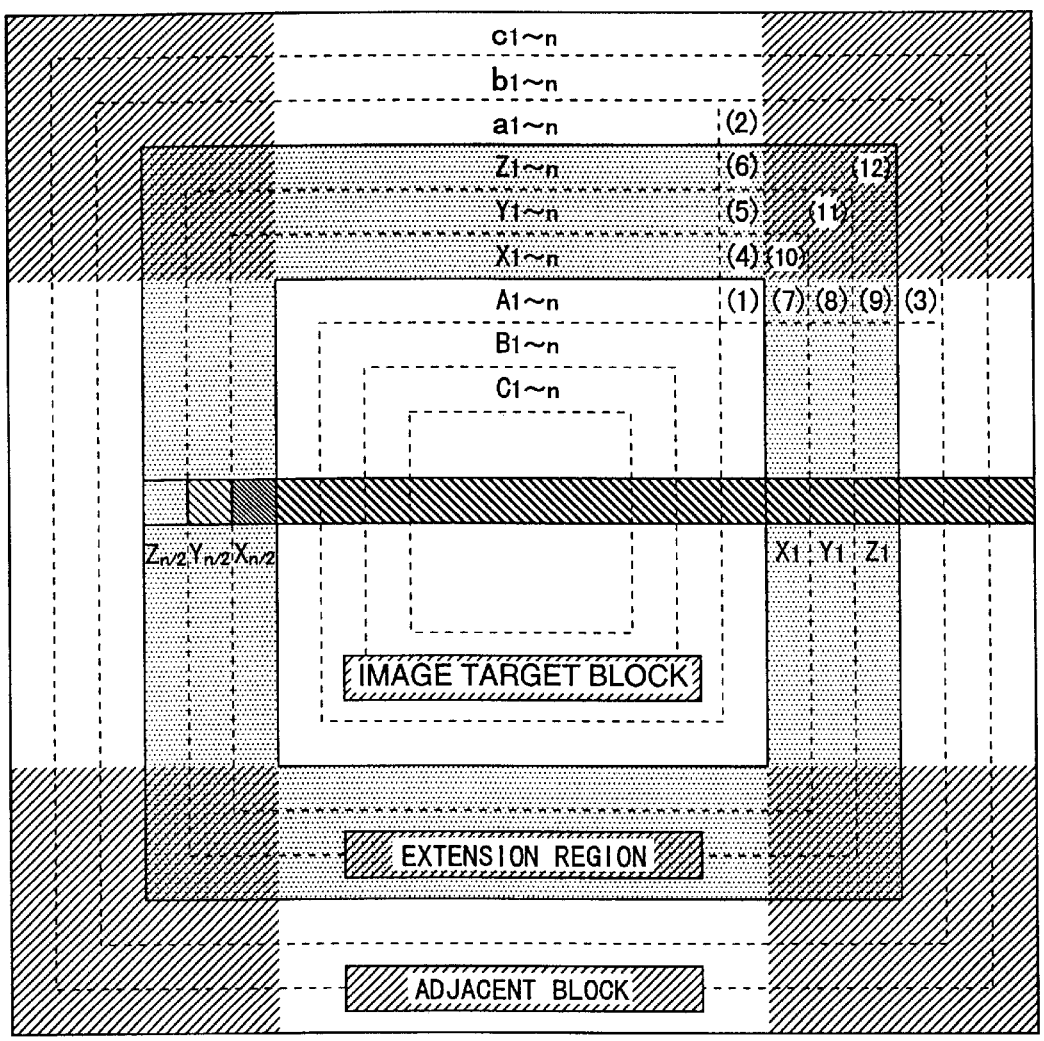
FIG. 5 is a diagram for describing the processing of an image processing apparatus in a second embodiment of the present invention.

FIG. 5 is a diagram for describing processing carried out by the image processing apparatus in the second embodiment.

Referring to FIG. 5, a target block (image target block) is cut out in block cut-out processing, and then an extension region necessary for DCT transform is added. The second embodiment is characterized in that image data peripheral to the target block of an original image (image data of an adjacent block) and data having the degree of change derived from the image data of the target block are used as the data of the extension region. In short, the data of extension region pixels (7), (8) and (9) are calculated from the data of pixel (1) in the target block and the data of pixel (3) in an adjacent pixel in FIG. 5. Here, such data that cause a linear change from the data of pixel (1) to the data of pixel (3) are set as the data of pixels (7), (8) and (9). Similarly, the data of pixels (4) to (6) are calculated from the data of pixels (1) and (2).

The data of pixels in the extension region surrounding the target block are calculated in a similar manner. Here, the data of pixels existing in the range of pixels (10) to (12) in FIG. 5 cannot be found from the data of adjacent blocks. Accordingly, as the data of pixels in this portion of the extension region, the average value of the adjacent pixel data is used. More specifically, the average value of the data of pixels (4) and (7) is used as the data of pixel (10).

Further, the average value of the data of pixels (5) and (8) is the data of three pixels in the range of (11). The average value of the data of pixels (6) and (9) is the data of five pixels in the range of (12).

Figure 6:
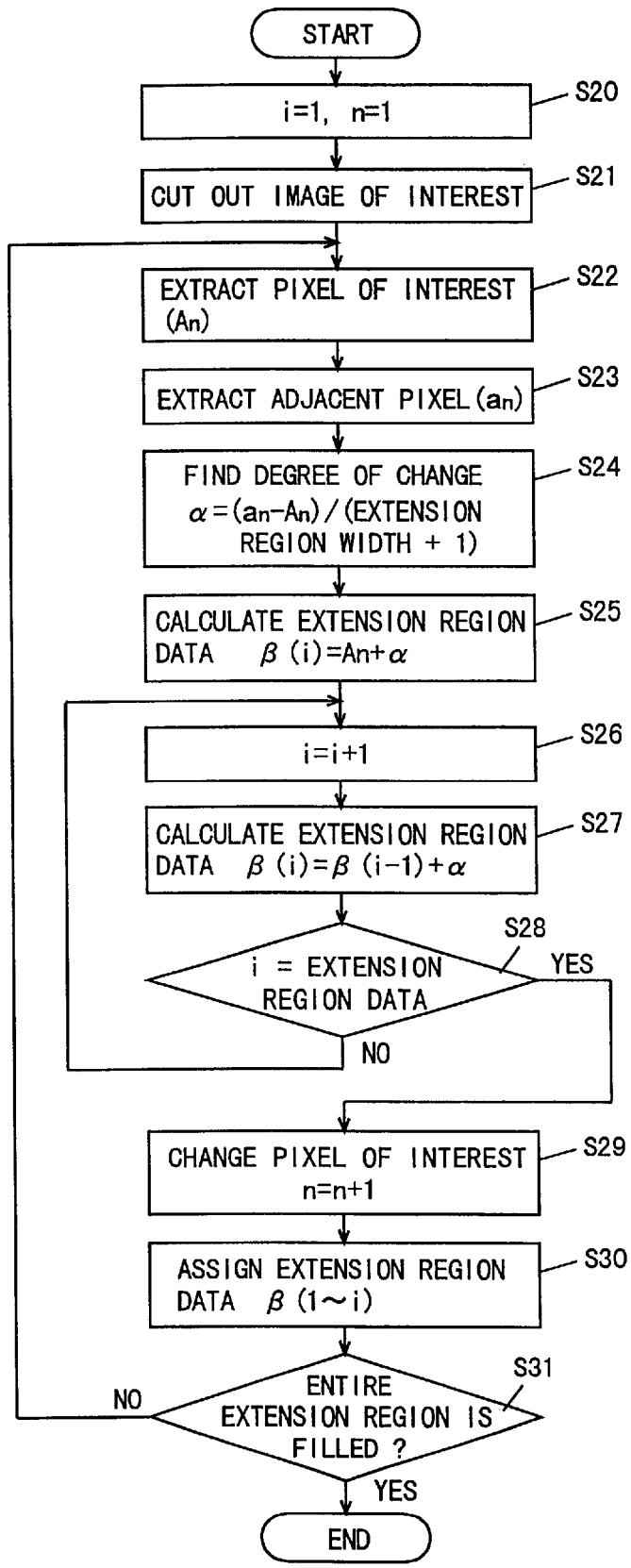
FIG. 6 is a flow chart showing the processing of setting an extension region in the second embodiment.

FIG. 6 is a flow chart showing the processing of setting an extension region carried out by the image processing apparatus in the second embodiment. This flow chart corresponds to steps S504 and S505 of the flow chart in FIG. 3.

Referring to the figure, the values of variables i and n that indicate the position of an extension region to be processed is set to 1 in step S20. In step S21, a target block is cut out. In step S22, one of the pixels that are outermost in the target block is picked up as a pixel of interest.

In step S23, pixel data in a block adjacent to the extension region is extracted corresponding to the pixel of interest. In other words, pixel (2) or (3) is extracted when the pixel that is to be processed in FIG. 5 is pixel (1), for example.

In step S24, the degree of change α is found. The expression (11) below is used to find the degree of change α.

$$\alpha = (a_n - A_n)/(\text{extension region width} + 1) \tag{11}$$

In the expression (11), $a_n$ is the data of an adjacent pixel and $A_n$ is the data of a pixel of interest. Further, the extension region width is the width of an extension region that exists between a target block and an adjacent block, and the width is that of three pixels indicated by (7) to (9) in FIG. 5.

In step S25, the data of a pixel in the extension region that is closest to the target block is calculated by the expression (12).

$$\beta(i)=A_n+\alpha \quad (12)$$

The expression is intended to find the data of pixel (7) when the data of the extension region is calculated based on pixels (1) and (3) in FIG. 5.

Then, the value of i is incremented by 1 in step S26. In step S27, the data of the next pixel in the extension region is calculated by the expression (13).

$$\beta(i)=\beta(i-1)+\alpha \quad (13)$$

This is intended to find the data of pixel (8) when the data of the extension region is found from the data of pixels (1) and (3) in the example of FIG. 5.

In step S28, a determination is made as to whether the value of i attains the extension region width, and the processing from step S26 is repeatedly carried out till the value attains it.

When the value of i attains the extension region width in step S28, the pixel of interest is changed by incrementing the value of n by 1 in step S29. In step S30, the data of $\beta(1)$ to $\beta(i)$ already found in step S30 are assigned as the data of the extension region.

In step S31, a determination is made as to whether the entire extension region is filled, and the processing from step S22 is repeatedly carried out till the region is filled.

After the data of the extension region is all found, the IM-GPDCT processing is carried out similarly to steps S506 to S517 in FIG. 3. Thus, pixel interpolation is completed.

FIG. 7 illustrates the effects of the image processing apparatus in this embodiment.

It is assumed that image data on cross section A in FIG. 15 is processed as shown in FIG. 7(a). At this time, the data having the degree of change derived from the image data of an adjacent block as shown in b) is set as an extension region in this embodiment.

Accordingly, an unnatural edge as shown in FIGS. 16 to 18 is not created between a target block and the extension region. Thus, after The IM-GPDCT processing, winding is not caused between the extension region and the target block (original image) as shown in c). Even when the original image is divided into a plurality of blocks, generation of an edge noise as well as a block noise that spreads to the entire image can be prevented. Further, the processing time in DCT transform even of a large sized original image can be shortened by dividing the original image into a plurality of blocks.

Third Embodiment

Since the block diagram of an image processing apparatus in a third embodiment of the present invention is similar to that of the first embodiment, the description will not be repeated. The third embodiment is characterized in that an average value of the image data of a target block and the image data of an adjacent block is used as pixel data in an extension region that is set around the target block.

Figure 8:
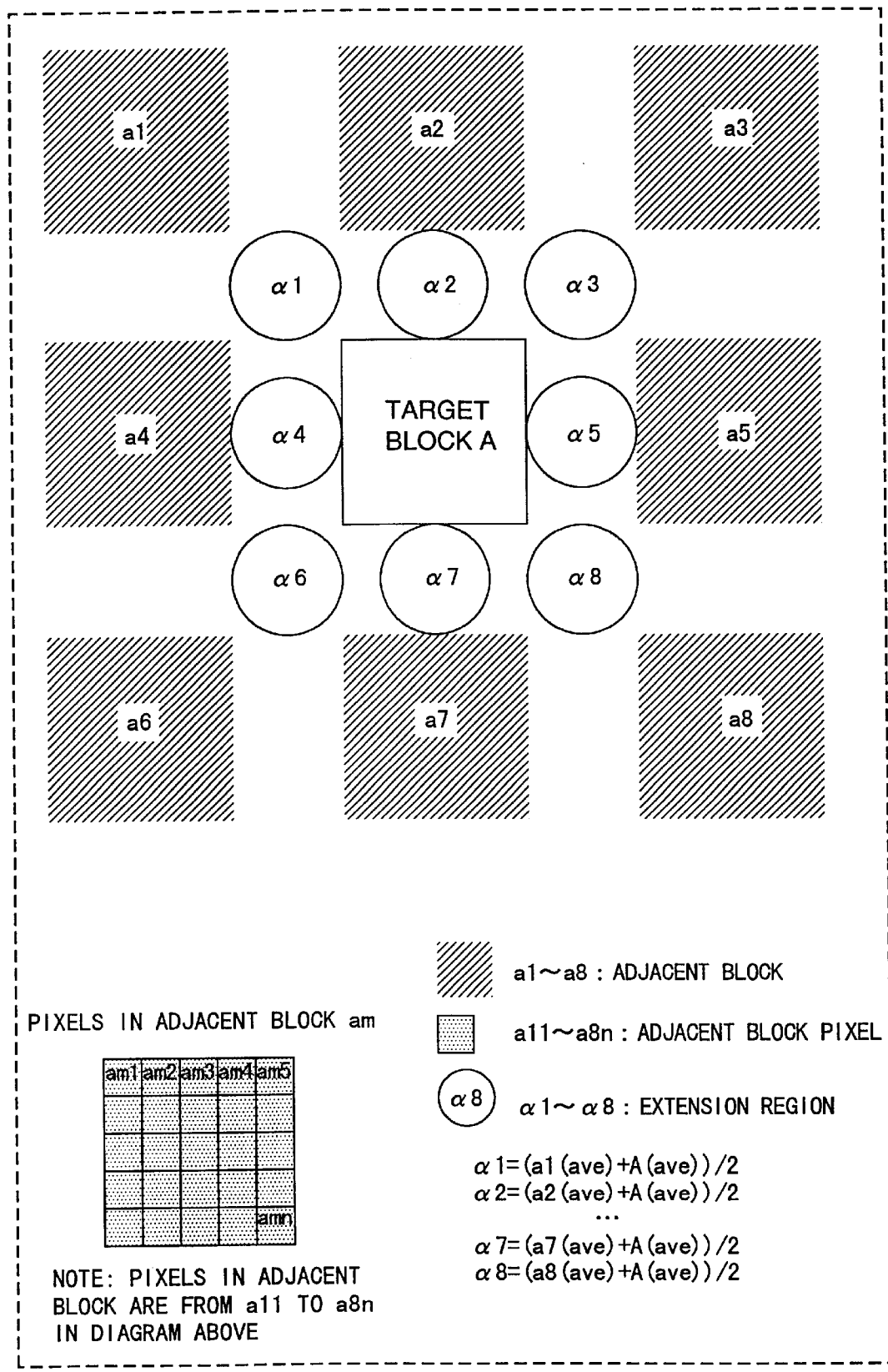
FIG. 8 is a diagram for describing the processing of an image processing apparatus in a third embodiment of the present invention.

More specifically, adjacent blocks existing around the block A of interest are a1 to a8 in FIG. 8. When the average value of the data of pixels included in block A of interest is A(ave), and the average values of the data of pixels included in each of adjacent blocks a1 to a8 are a1(ave) to a8(ave), respectively, the data of pixels in extension regions $\alpha 1$ to $\alpha 8$ are set by $\alpha 1$ to $\alpha 8$ as in the expression (14).

$$\alpha 1=[A(\text{ave})+a1(\text{ave})]/2$$

$$\alpha 2=[A(\text{ave})+a2(\text{ave})]/2$$

$$\alpha 8=[A(\text{ave})+a8(\text{ave})]/2 \quad (14)$$

FIG. 9 is a flow chart showing the processing of setting an extension region carried out by the image processing apparatus in this embodiment. The flow chart corresponds to steps S504 and S505 in FIG. 3.

Referring to FIG. 9, a target block is cut out in step S121. Then, data A1 to An of all pixels included in the target block are extracted in step S122.

In step S123, the data of all pixels included in each of adjacent blocks a1 to a8 are extracted. In step S124, an average of the data of pixels included in the target block is calculated.

In step S125, an average of the data of pixels included in each of the adjacent blocks is calculated.

In step S126, each data of extension regions $\alpha 1$ to $\alpha 8$ is calculated based on the expression (14).

In step S127, a determination is made as to whether the entire extension region is filled by the data and, when it is not, an adjacent block to be processed is changed in step S128 and the processing from step S123 is repeatedly carried out.

When the extension region is filled in step S127, the processing here is finished. The processing from step S506 in FIG. 3 is performed.

Figure 10:
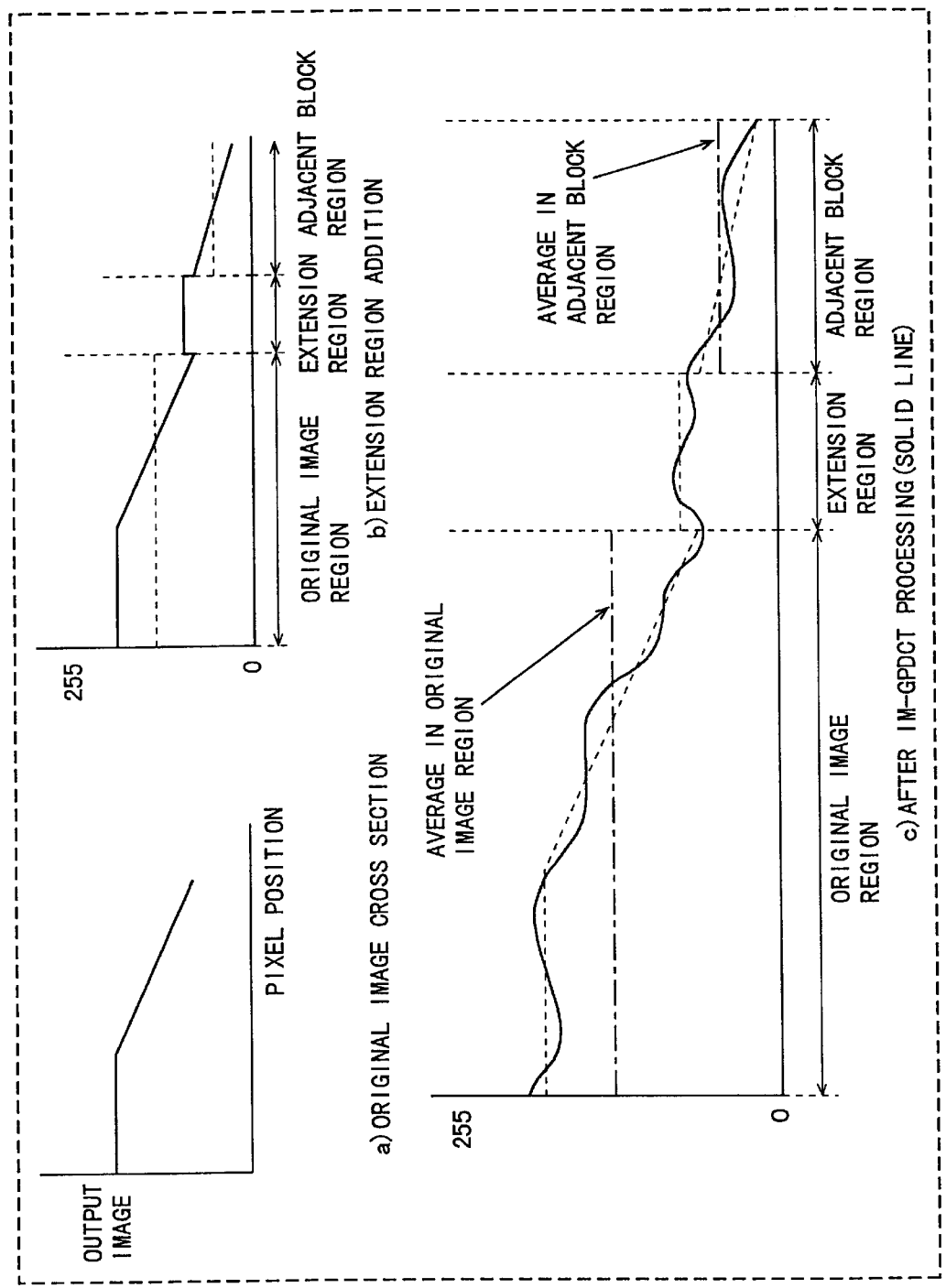
FIG. 10 illustrates the effects of the image processing apparatus in the third embodiment.

FIG. 10 illustrates the effects of the image processing apparatus in this embodiment.

Referring to FIG. 10a), it is assumed that the data of an original image is of cross section A in FIG. 15. At this time, an average value of the average value of the data of pixels included in an adjacent block and the average value of the data of pixels included in a target block is used as the data of an extension region as shown in b) in this embodiment. Thus, an unnatural edge is not created between the target block and the extension region as shown in FIG. 10c), and winding is also not caused even after the IM-GPDCT processing. Accordingly, similar effects to those of the first and second embodiments can also be attained in this embodiment.

Fourth Embodiment

Since the overall structure of an image processing apparatus in a fourth embodiment is the same as the one shown in FIG. 1, the description will not be repeated.

Figure 11:
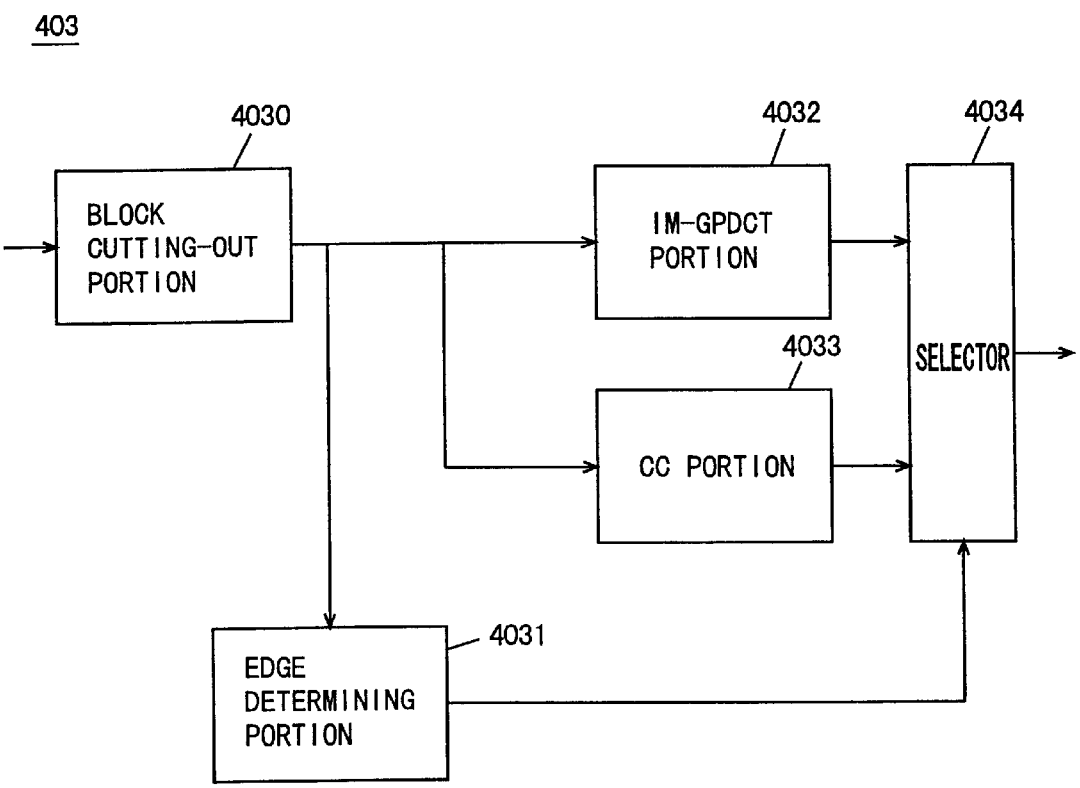
FIG. 11 is a block diagram showing a structure of a resolution converting portion 403 in a fourth embodiment of the present invention.

In this embodiment, the structure shown in FIG. 11 is adopted as resolution converting portion 403.

FIG. 11 is a block diagram showing a specific structure of resolution converting portion 403 in FIG. 1.

Resolution converting portion 403 includes a block cutting-out portion 4030 for cutting out a block from image data stored in input image memory portion 402, an edge determining portion 4031 for determining whether an edge component is included in the cut-out block, an IM-GPDCT portion 4032 for carrying out pixel interpolation on the image of the cut-out block using the IM-GPDCT method, a CC portion 4033 for carrying out pixel interpolation on the image of the cut-out block by the Cubic Convolution method (hereinafter, referred to as the CC method), and a selector 4034 for selecting a preferred one of the output of IM-GPDCT portion 4032 and the output of CC portion 4033.

When an edge component exists in the image of a cut-out block, the image processing apparatus in this embodiment adopts the IM-GPDCT method restoring a high frequency component, which is lost during a sampling operation, under the two restrictive conditions that information on a passing frequency band is correct and an expanse of an image is limited. When an edge component does not exist, the image processing apparatus adopts the CC method that is an interpolation method not restoring a high frequency component of image data. Accordingly, a lost high frequency component can be restored and high speed image processing can be made possible in the image processing apparatus in this embodiment.

Although the Cubic Convolution method is adopted as an interpolation method not restoring a high frequency component in this embodiment, a processing portion that adopts the Nearest Neighbor method or the Bilinear method, as other representative resolution conversion methods, may be employed in stead of CC portion 4033.

Figure 12:
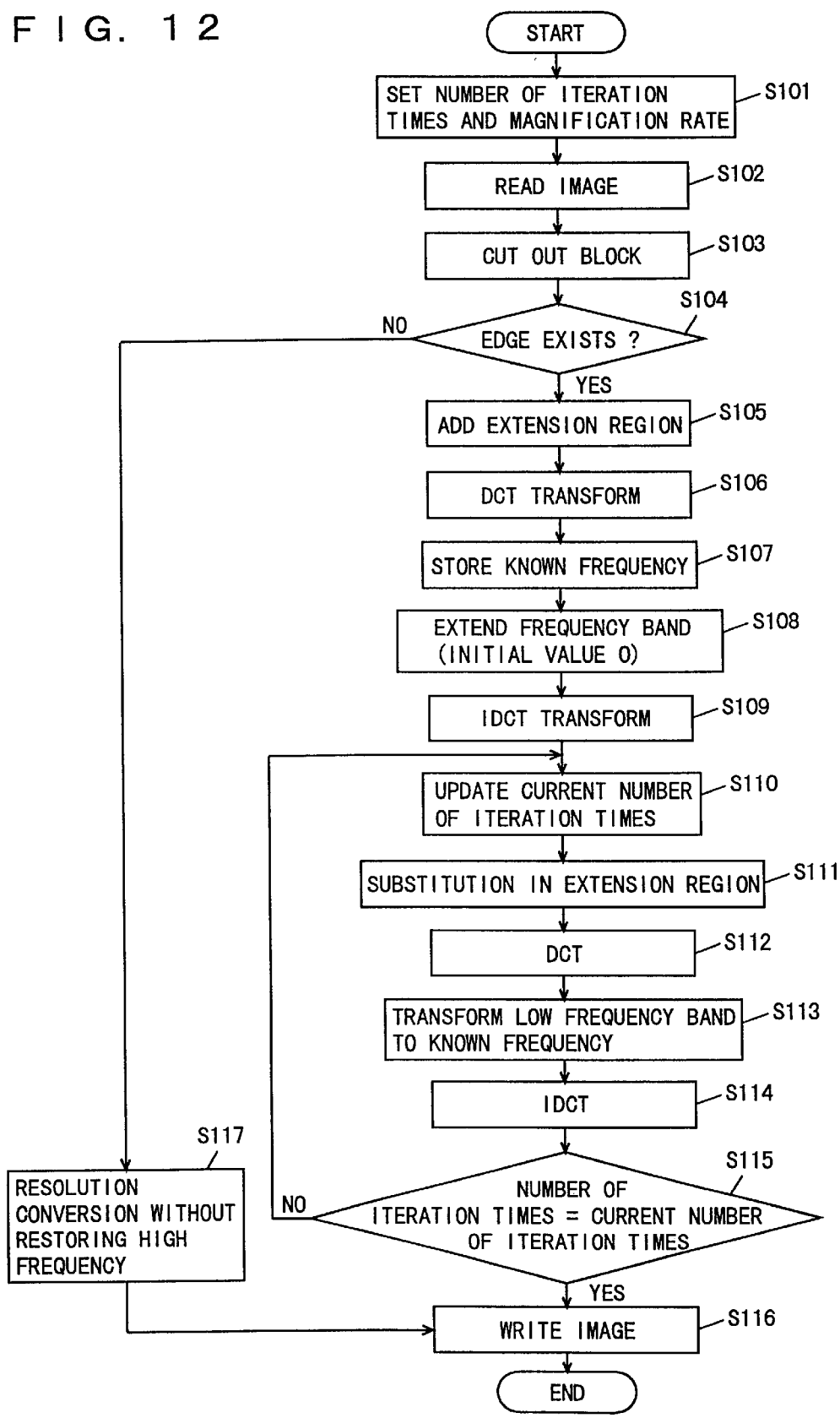
FIG. 12 is a flow chart of resolution conversion processing in the fourth embodiment.

FIG. 12 is a flow chart showing the image magnification processing carried out by the image processing apparatus in this embodiment.

Referring to the figure, the number of iteration times in the IM-GPDCT method and the magnification rate are set in step S101. In step S102, an input image is read through input interface portion 402 to input image memory portion 402. In step S103, a block is cut out from the image data stored in input image memory portion 402 by block cutting-out portion 4030.

In step S104, a determination is made as to whether an edge portion (edge component) exists in the image of the cutout block. When it does, the same processing (image processing using the IM-GPDCT method) as steps S4 to S15 in FIG. 15 is carried out in steps S105 to S116.

When an edge portion does not exist, resolution is converted by a method (such as the CC method) that does not restore a high frequency component in step S117. Thereafter, the processed image is stored in output image memory portion 405 through selector 4034 in step S116.

Figure 13:
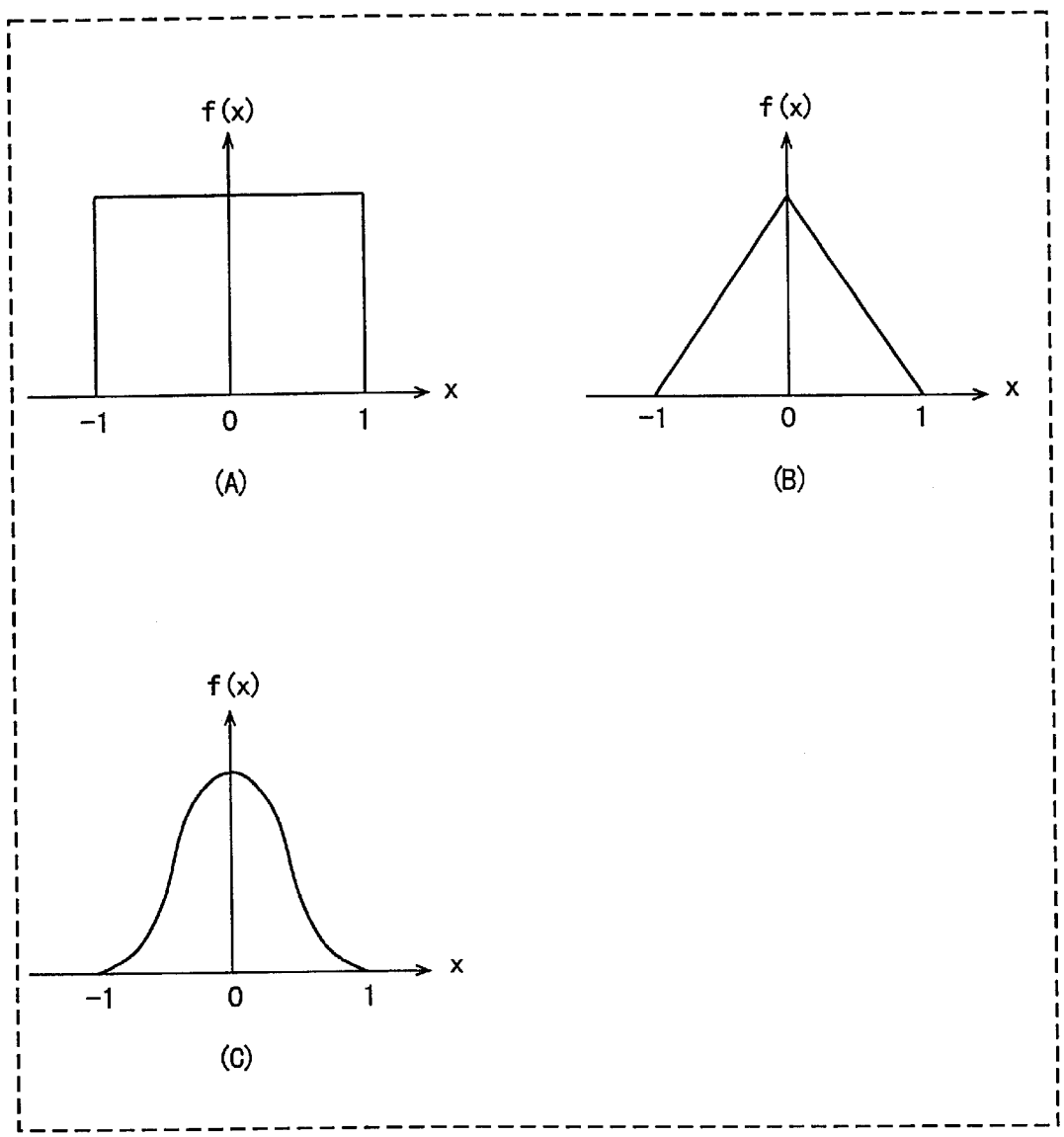
FIG. 13 illustrates a resolution conversion method not reproducing a high frequency component.
Figure 14:
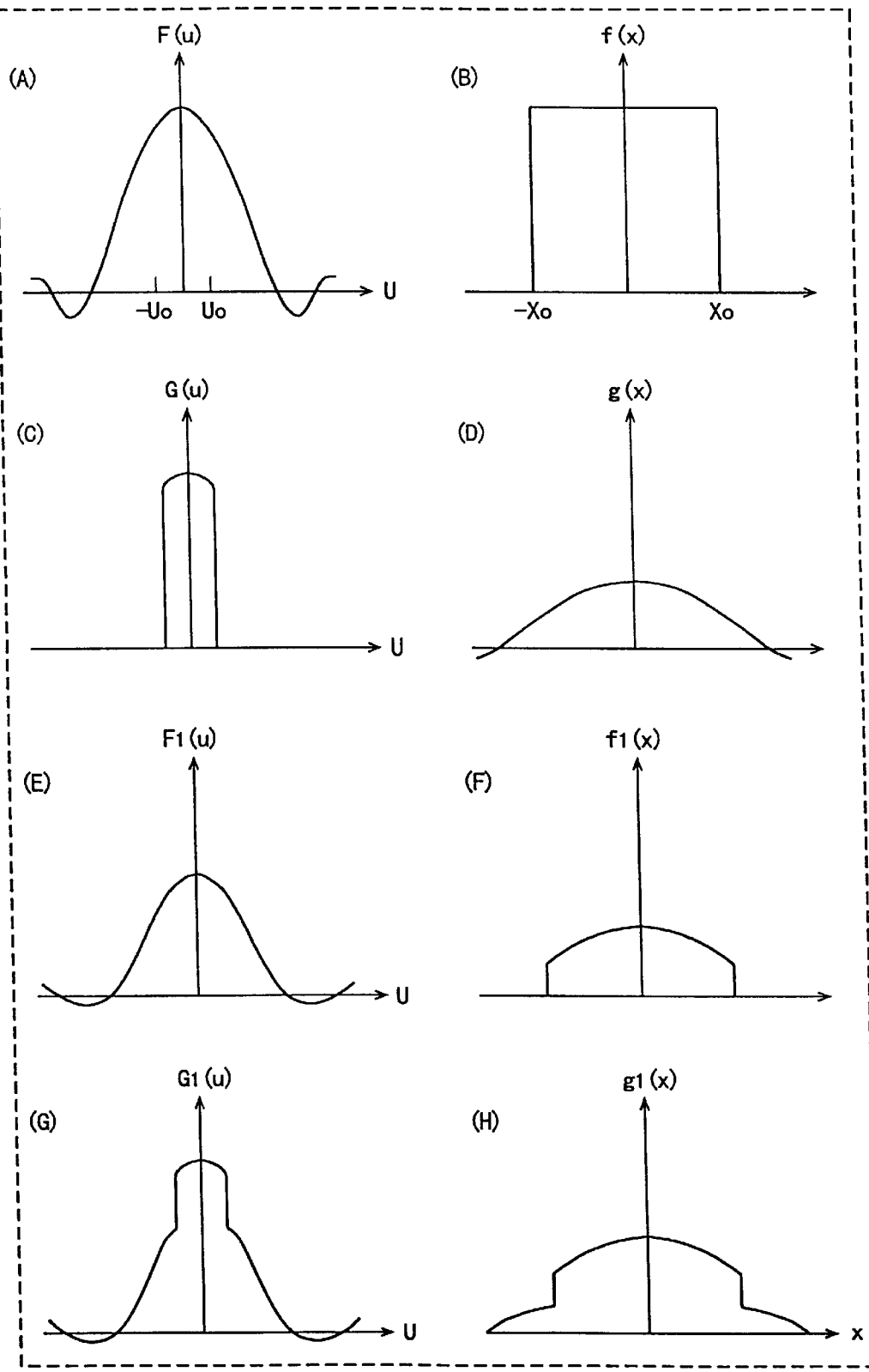
FIG. 14 illustrates the principle of the IM-GPDCT method.

FIG. 13 illustrates the resolution conversion method, which does not restore a high frequency component, carried out in step S117 in FIG. 12. In the figure, (A) shows processing by the Nearest Neighbor method, (B) shows processing by the Bilinear method, and (C) shows the Cubic Convolution processing. In each of them, the value of image data (pixel density) f(x) is determined at pixel position x=−1, 0, 1. It is assumed that pixel data is interpolated between pixels (x=−0.5, 0.5, for example).

Referring to (A), in the Nearest Neighbor method, the value of a pixel closest to a pixel to be interpolated (point of interest) is adopted as it is as the image data of the pixel to be interpolated.

Referring to (B), in the Bilinear method, the value of a peripheral pixel is linearly changed according to the distance from a pixel to be interpolated, and a value on the line is adopted as the image data of the pixel to be interpolated.

Referring to (C), in Cubic Convolution, the degree to which the image data of an peripheral pixel is reflected is changed in a curve manner according to the distance from a pixel to be interpolated, and data on the curve is used.

In the embodiment, a block is cut out and, based on whether an edge component exists in the cut-out block, an image processing method is switched. However, the processing method for the entire image may be switched according to the determination result as to whether an edge component exists in any portion of an input image data, without cutting out a block.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pixel interpolating device for interpolating a pixel by restoring a lost high frequency component under two restrictive conditions that information on a passing frequency band is correct and an expanse of an image is limited in a process in which normal transformation and inverse transformation of the image is repeated by orthogonal transformation, the pixel interpolating device comprising:

a cutting-out unit for cutting out a target block from a target region of an original image; and a setting unit for setting data of an extension region, which is required for pixel interpolation, of the thus cut out target block, wherein the thus set extension region data is based on image data that is peripheral to the target region of said original image.

2. A pixel interpolating device according to claim 1, wherein said setting unit uses the image data peripheral to the target region of said original image as the data of the extension region of said target block.

3. A pixel interpolating device according to claim 2, further comprising a magnifying unit for magnifying the image data peripheral to the target region of said original image by an interpolation method not restoring a high frequency component, wherein said setting unit uses the image data magnified by said magnifying unit.

4. A pixel interpolating device according to claim 1, wherein said setting unit uses data having a degree of change derived from the image data peripheral to the target region of said original image and image data of the target block as the data of the extension region of said target block.

5. A pixel interpolating device according to claim 1, wherein said setting unit uses an average value of the image data of the target block of said original image and image data peripheral to the target region of said original image as the data of the extension region of said target block.

6. A pixel interpolating device according to claim 1, wherein said orthogonal transformation is discrete cosine transform (DCT).

7. A pixel interpolating device adapted for carrying out a plurality of pixel interpolation methods in an input image, comprising:

a determining unit for determining whether an edge portion exists in said input image; and a selecting unit for selecting one of the plurality of pixel interpolation methods for said input image based on the determination result of said determining unit, wherein said plurality of pixel interpolation methods includes a first pixel interpolation method including the steps of:

cutting out a target block from a target region of original image data, adding an extension region around the target block to obtain an extension block, data of the extension region being set based on image data peripheral to the target region of the original image data.

8. A pixel interpolating device according to claim 7, wherein said selecting unit selects the first pixel interpolation method when an edge portion exists in said input image and selects a second pixel interpolation method when an edge portion does not exist in said input image, wherein said first pixel interpolation method restores a high frequency component, which is lost during sampling, under two restrictive conditions that information on a passing frequency band is correct and an expanse of an image is limited in a process in which normal transformation and inverse transformation of the image is repeated by orthogonal transformation, and wherein said second pixel interpolation method is an interpolation method not restoring a high frequency component of image data.

9. A pixel interpolating device according to claim 7, further comprising a block cutting-out unit for performing the step of cutting out the target block from said input image, wherein said determining unit determines whether an edge portion exists in the thus cut-out block.

10. The pixel interpolation device according to claim 8, wherein said orthogonal transformation is discrete cosine transform (DCT).

11. A pixel interpolation method, comprising the steps of:
a) cutting out a target block from a target region of original image data;
b) adding an extension region around the target block to obtain an extension block, data of the extension region being set based on image data peripheral to the target region of the original image;
c) carrying out a discrete cosine transform on image data of said-extension block to obtain a frequency component;
d) extending the thus obtained frequency component to a high frequency region to obtain a broad frequency component, and setting an initial value of a frequency component of the high frequency region to 0;
e) carrying out an inverse discrete cosine transform on the broad frequency component obtained by extending a frequency region in d) to obtain image data of a magnified extension block, the magnified extension block including a magnified target block at a center of the magnified extension block;
f) setting data of a peripheral region of the magnified target block in the magnified extension block based on the image data peripheral to the target region of the original image;
g) carrying out a discrete cosine transform on image data of the extension block obtained in f) to obtain a frequency component;
h) substituting a low frequency region of the frequency component obtained in g) with the frequency component obtained in c); and
i) carrying out an inverse discrete cosine transform on the frequency component obtained in h) to obtain image data,
wherein magnified image data is obtained by repeating said steps f) to i) a prescribed number of times.

12. A pixel interpolation method according to claim 11, wherein the image data peripheral to the target region of the original image is used as the data of the extension region in the step b).

13. A pixel interpolation method according to claim 12, wherein data formed by converting a pixel density of the image data peripheral to the target region of said original image is used as the data of the peripheral region in the step f).

14. A pixel interpolation method according to claim 11, wherein data having a degree of change calculated from the image data peripheral to the target region of said original image and image data of the target block of said original image is used as the data of the peripheral region in the step b).

15. A pixel interpolation method according to claim 11, wherein an average value of the image data of the target block of said original image and the image data peripheral to the target region of said original image is used as the data of the peripheral region in the step b).

16. A pixel interpolation method, comprising the steps of:
determining whether an edge portion exists in an input image,
selecting one of a first pixel interpolation method and a second pixel interpolation method based on the result obtained in the determining step; and
carrying out pixel interpolation on the input image by the selected pixel interpolation method,
wherein said first pixel interpolation method includes the steps of:
a) cutting out a target block from a target region of original image data,
b) adding an extension region around the target block to obtain an extension block, data of the extension region being set based on image data peripheral to the target region of the original image data.

17. A pixel interpolation method according to claim 16, wherein said first pixel interpolation method further includes the steps of:
c) carrying out a discrete cosine transform on image data of said extension block to obtain a frequency component,
d) extending said obtained frequency component to a high frequency region and setting an initial value of a frequency component of the high frequency region to 0,
e) carrying out an inverse discrete cosine transform on the frequency component obtained by extending the frequency region in d) to obtain image data of a magnified extension block, the magnified extension block including a magnified target block at a center of the magnified extension block,
f) setting data of a peripheral region of the magnified target block in the magnified extension block based on the image data peripheral to the target region of the original image,
g) carrying out a discrete cosine transform on image data of the extension block obtained in f) to obtain a frequency component,
h) substituting a low frequency region of the frequency component obtained in g) by the frequency component obtained in c), and
i) carrying out an inverse discrete cosine transform on the frequency component obtained in h) to obtain image data,
wherein magnified image data is obtained by repeating said steps f) to i) a prescribed number of times.

18. An image processing apparatus for carrying out pixel interpolation by restoring a high frequency component by repeating normal transformation and inverse transformation of an image through orthogonal transformation, comprising:
a cutting-out unit for cutting out a target block from a target region of original image data;
a setting unit for setting an extension block by adding an extension region around the target block, data of the extension region being determined based on image data peripheral to the target region of the original image;
a transforming unit for performing a discrete cosine transform on image data of said extension block to obtain a frequency component;

a frequency extending unit-for extending the thus obtained frequency component to a high frequency region and setting a prescribed value as an initial value of a frequency component of the high frequency region; and an inverse transforming unit for performing an inverse discrete cosine transform on the thus extended frequency component to obtain magnified image data.

19. An image processing apparatus according to claim 18, wherein said setting unit sets the image data peripheral to said target region of said original image as the data of said extension region.

20. An image processing apparatus according to claim 18, wherein said setting unit sets data having a degree of change calculated from the image data peripheral to the target region of said original image and image data of the target block of said original image as the data of said extension region.

21. An image processing apparatus according to claim 18, wherein said setting unit sets an average value of image data of the target block of said original image and the image data peripheral to the target region of said original image as the data of said extension region.

22. An image processing apparatus, comprising:

a first pixel interpolating unit for carrying out pixel interpolation by restoring a high frequency component of an image which is lost during sampling;

a second pixel interpolating unit for carrying out a pixel interpolation method different from the first pixel interpolating unit;

a determining unit for determining whether an edge portion exists in an input image; and a selecting unit for selecting one of said first and second pixel interpolating units based on the thus obtained determination result, wherein said first pixel interpolating unit includes:

a cutting-out unit for cutting out a target block from a target region of original image data;

a setting unit for setting an extension block by adding an extension region around the target block, data of the extension region being determined based on image data peripheral to the target region of the original image.

23. An image processing apparatus according to claim 22, wherein said first pixel interpolating unit further includes:

a transforming unit for performing a discrete cosine transform on image data of said extension block to obtain a frequency component;

a frequency extending unit for extending the thus obtained frequency component to a high frequency region and setting a prescribed value as an initial value of a frequency component of the high frequency region; and an inverse transforming unit for performing an inverse discrete cosine transform on the thus extended frequency component to obtain magnified image data.

24. A pixel interpolating device according to claim 1, wherein the target block is substantially the same size as the target region.

25. A pixel interpolation method according to claim 11, wherein the target block is substantially the same size as the target region.

26. An image processing apparatus according to claim 18, wherein the target block is substantially the same size as the target region.

27. An image processing apparatus according to claim 23, wherein the target block is substantially the same size as the target region.

* * * * *